(12) United States Patent
Kikuchi et al.

(10) Patent No.: US 8,455,390 B2
(45) Date of Patent: Jun. 4, 2013

(54) EXHAUST GAS PURIFYING CATALYST

(75) Inventors: Hiroto Kikuchi, Hiratsuka (JP);
Masanori Nakamura, Yokosuka (JP);
Hironori Wakamatsu, Yokohama (JP);
Katsuo Suga, Yokohama (JP);
Toshiharu Miyamura, Yokohama (JP);
Jun Ikezawa, Yokosuka (JP); Tetsuro Naito, Yokohama (JP); Junji Ito, Yokohama (JP)

(73) Assignee: Nissan Motor Co., Ltd., Yokohama-shi (JP)

( * ) Notice: Subject to any disclaimer, the term of this patent is extended or adjusted under 35 U.S.C. 154(b) by 330 days.

(21) Appl. No.: 13/002,175

(22) PCT Filed: Jun. 23, 2009

(86) PCT No.: PCT/JP2009/061417
§ 371 (c)(1),
(2), (4) Date: Dec. 30, 2010

(87) PCT Pub. No.: WO2010/001765
PCT Pub. Date: Jan. 7, 2010

(65) Prior Publication Data
US 2011/0094211 A1    Apr. 28, 2011

(30) Foreign Application Priority Data

| Jul. 4, 2008 | (JP) | ................................ 2008-175664 |
| Nov. 10, 2008 | (JP) | ................................ 2008-287967 |
| Mar. 9, 2009 | (JP) | ................................ 2009-055005 |
| Mar. 9, 2009 | (JP) | ................................ 2009-055013 |

(51) Int. Cl.
*B01J 23/00* (2006.01)
*B01J 21/00* (2006.01)

(52) U.S. Cl.
USPC ........... 502/300; 502/240; 502/258; 502/259; 502/260; 502/261; 502/262; 502/263; 502/324; 502/326; 502/332; 502/333; 502/334; 502/335; 502/336; 502/337; 502/338; 502/339; 502/355; 502/415; 502/439; 502/527.12; 502/527.13; 502/527.23; 502/527.24

(58) Field of Classification Search
USPC ................. 502/240, 258–263, 300, 324, 326, 502/332–339, 355, 415, 439, 527.12, 527.13, 502/527.23, 527.24; 422/170, 177, 180
See application file for complete search history.

(56) References Cited

U.S. PATENT DOCUMENTS 6,159,897 A * 12/2000 Suzuki et al. .................. 502/351
6,221,804 B1 * 4/2001 Yamada et al. ............... 502/326
6,852,665 B2 * 2/2005 Morikawa et al. ............ 502/302

(Continued)

FOREIGN PATENT DOCUMENTS

| EP | 2039425 A1 | 3/2009 |
| JP | 6-210172 A | 8/1994 |

(Continued)

*Primary Examiner* — Cam N. Nguyen
(74) *Attorney, Agent, or Firm* — Foley & Lardner LLP

(57) ABSTRACT

An exhaust gas purifying catalyst includes a monolithic substrate (2), and a transition metal oxide layer (3) formed in the monolithic substrate (2). The transition metal oxide layer (3) contains transition metal oxide powder including: transition metal oxide particles (10); a first compound (20) on which the transition metal oxide particles (10) are supported; and a second compound (30) that surrounds a single body or an aggregate of the transition metal oxide particles (10) and the first compound (20).

14 Claims, 9 Drawing Sheets

U.S. PATENT DOCUMENTS

| | | | |
|---|---|---|---|
| 7,037,875 B2* | 5/2006 | Hu et al. | 502/304 |
| 7,056,859 B2* | 6/2006 | Hachisuka | 502/327 |
| 7,169,735 B2* | 1/2007 | Sagae | 502/326 |
| 7,229,947 B2* | 6/2007 | Hara et al. | 502/327 |
| 7,247,597 B2* | 7/2007 | Morikawa et al. | 502/304 |
| 7,276,212 B2* | 10/2007 | Hu et al. | 422/177 |
| 7,449,237 B2* | 11/2008 | Chan et al. | 428/403 |
| 7,547,656 B2* | 6/2009 | Miura | 502/327 |
| 7,572,542 B2* | 8/2009 | Naoi | 429/483 |
| 7,585,811 B2* | 9/2009 | Nakamura et al. | 502/327 |
| 7,601,670 B2* | 10/2009 | Yasuda et al. | 502/326 |
| 7,605,108 B2* | 10/2009 | Wakamatsu et al. | 502/326 |
| 7,618,919 B2* | 11/2009 | Shimazu et al. | 502/439 |
| 7,674,744 B2* | 3/2010 | Shiratori et al. | 502/327 |
| 7,713,908 B2* | 5/2010 | Yamamoto et al. | 502/300 |
| 7,713,911 B2* | 5/2010 | Wakamatsu et al. | 502/332 |
| 7,851,405 B2* | 12/2010 | Wakamatsu et al. | 502/332 |
| 7,867,943 B2* | 1/2011 | Takeshima | 502/327 |
| 7,989,387 B2* | 8/2011 | Miura | 502/304 |
| 8,038,954 B2* | 10/2011 | Li | 422/180 |
| 8,080,494 B2* | 12/2011 | Yasuda et al. | 502/327 |
| 2009/0111688 A1 | 4/2009 | Nakamura et al. | |

FOREIGN PATENT DOCUMENTS

| | | |
|---|---|---|
| JP | 8-47640 A | 2/1996 |
| JP | 2000-262863 A | 9/2000 |
| JP | 3882627 B2 | 11/2006 |
| JP | 2007-697 A | 1/2007 |
| JP | 2007-50382 A | 3/2007 |
| JP | 2007-313493 A | 12/2007 |
| JP | 2008-18322 A | 1/2008 |
| WO | WO 2007/052627 A1 | 10/2007 |

* cited by examiner

EXHAUST GAS PURIFYING CATALYST

TECHNICAL FIELD

The present invention relates to an exhaust gas purifying catalyst to purify exhaust gas discharged from an internal combustion engine. Specifically, the present invention relates to an exhaust gas purifying catalyst utilizing a transition metal oxide in order to reduce the amount of noble metal to be used.

BACKGROUND ART

In recent years, in view of a global resource conservation and reduction of manufacturing costs in response to soaring costs of noble metal, a reduction in the amount of noble metal to be used for an exhaust gas purifying catalyst is desired. In order to reduce the amount of noble metal to be used, transition metal such as iron for an exhaust gas purifying catalyst has been proposed (for example, refer to Patent Documents 1 to 4). Further, advances are being made in the development of noble metal particles that have large surface areas for the purpose of high activation of an exhaust gas purifying catalyst (for example, refer to Patent Document 5).

CITATION LIST

Patent Literature

Patent Document 1: Japanese Patent Unexamined Publication No. H06-210172 (Japanese Patent No. 3503073)
Patent Document 2: Japanese Patent Unexamined Publication No. H08-47640
Patent Document 3: Japanese Patent No. 3882627
Patent Document 4: Japanese Patent Unexamined Publication No. 2000-262863
Patent Document 5: International Publication No. WO 2007/052627 (Japanese Patent Application No. 2005-318370, Japanese Patent Application No. 2006-045790)

SUMMARY OF INVENTION

However, in the catalyst described in Patent Document 1, there is a problem that a catalyst effect is decreased because iron oxide particles are aggregated due to heat history. Similarly, in the catalyst described in Patent Document 2, there is a problem that a catalyst effect is decreased because iron oxide particles and noble metal particles are aggregated and coarsened due to heat history. In the catalyst described in Patent Document 3, there is a problem that catalyst activity is insufficient in a low temperature range. In the catalyst described in Patent Document 4, the catalyst containing rhodium is hard to activate, which causes a low purifying effect. In the catalyst described in Patent Document 5, a further reduction of the amount of noble metal to be used and improvement of catalyst activity are desired.

The present invention has been devised in view of such conventional problems. It is an object of the present invention to provide an exhaust gas purifying catalyst in which a reduction of catalyst activity caused by a decrease in a specific surface area of a transition metal oxide is prevented by inhibiting aggregation of transition metal oxide particles due to heat history.

It is an aspect of the present invention to provide an exhaust gas purifying catalyst comprising: a monolithic substrate; a transition metal oxide layer formed in the monolithic substrate, the transition metal oxide layer comprising: transition metal oxide powder that includes: transition metal oxide particles; a first compound on which the transition metal oxide particles are supported; and a second compound that surrounds a single body or an aggregate of the transition metal oxide particles and the first compound.

DESCRIPTION OF EMBODIMENTS

The following is a description of an exhaust gas purifying catalyst according to the present invention with reference to the drawings. Note that, in this description, "%" with respect to concentrations, contents, blending quantities and the like represents a mass percentage unless otherwise specified.

First Embodiment

First, an exhaust gas purifying catalyst according to First Embodiment and a method for manufacturing the same will be explained with reference to the drawings.

(Exhaust Gas Purifying Catalyst)

The exhaust gas purifying catalyst according to the present embodiment includes a monolithic substrate such as a honeycomb monolithic substrate (honeycomb substrate), on which at least a transition metal oxide layer is formed. As the monolithic substrate, a monolithic substrate composed of a heat resistant material such as cordierite and ferritic stainless steel is used. The transition metal oxide layer contains transition metal oxide powder composed of transition metal oxide particles, promoter particles and barrier particles. All of or some of the transition metal oxide particles are in contact with the promoter particles. The barrier particles inhibit the movement of the transition metal oxide particles and the promoter particles.

Figure 1:
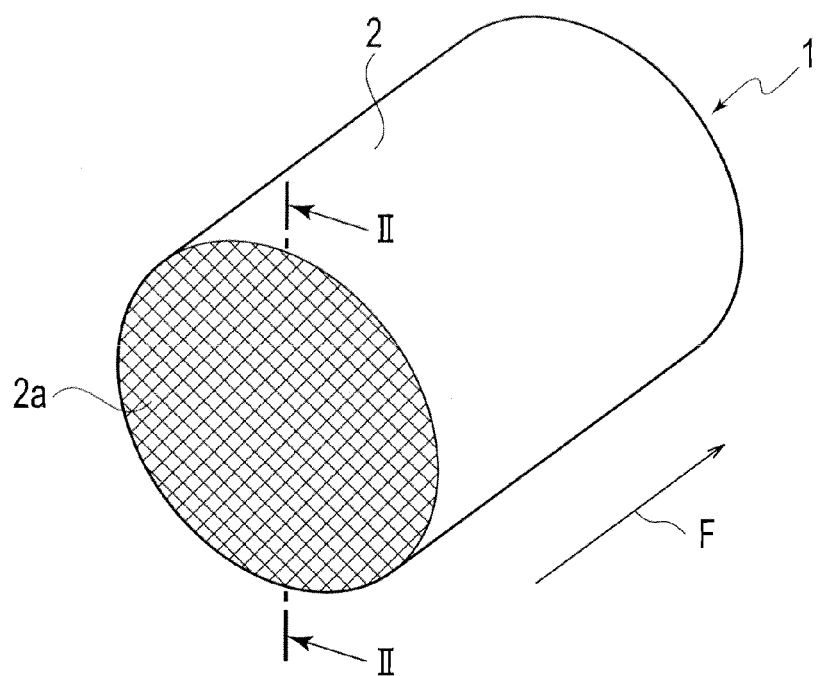
FIG. 1 is a perspective view showing an exhaust gas purifying catalyst according to First Embodiment.
Figure 2:
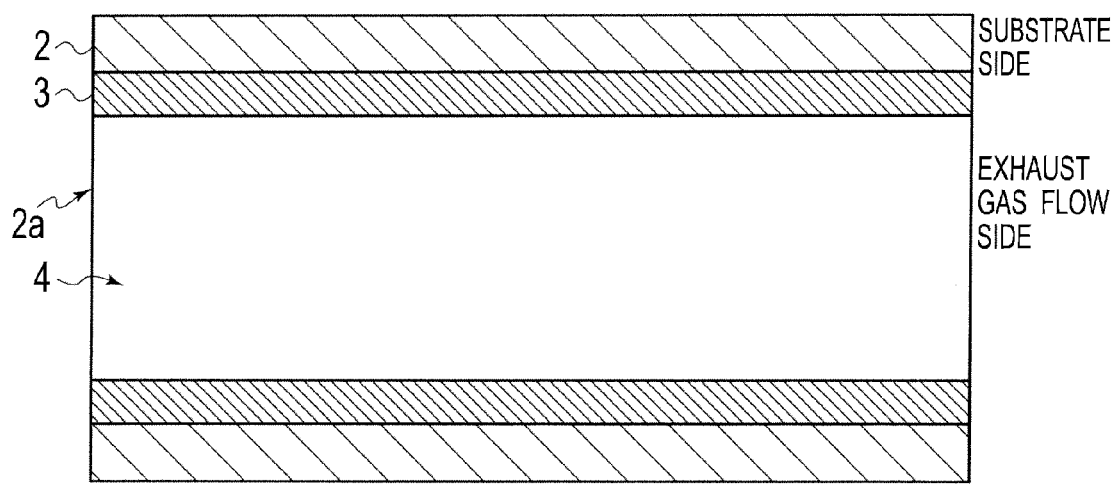
FIG. 2 is an enlarged cross-sectional view taken along the line II-II of the exhaust gas purifying catalyst shown in FIG. 1.
Figure 3:
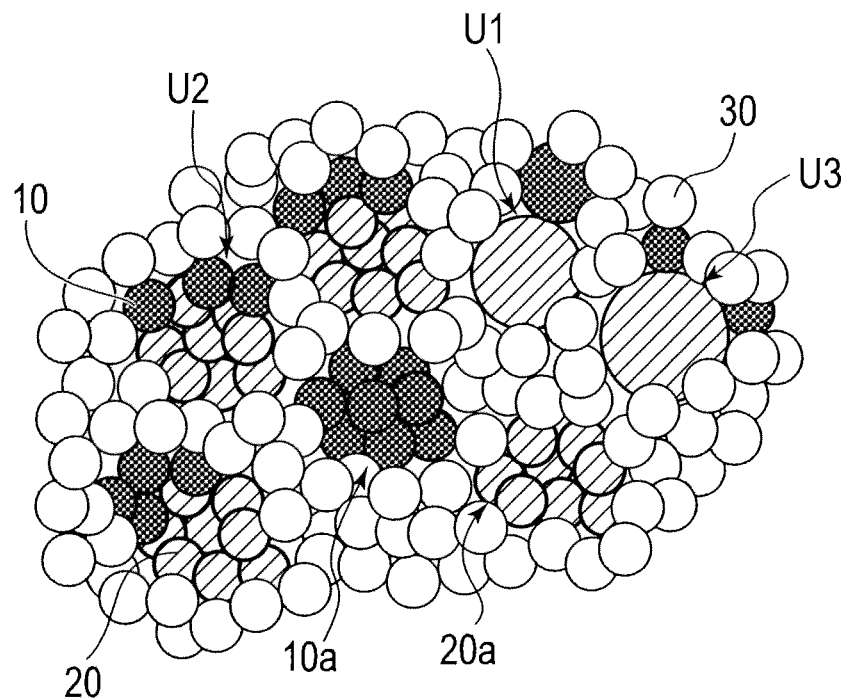
FIG. 3 is a view showing an example of a constitution of transition metal oxide powder used in the exhaust gas purifying catalyst.

Particularly, as shown in FIGS. 1 and 2, an exhaust gas purifying catalyst 1 includes a monolithic substrate 2 having a plurality of cells 2a. Exhaust gas passes through each cell 2a in a direction F of an exhaust gas flow, so that the exhaust gas is purified by coming in contact with a transition metal oxide layer 3. As shown in FIG. 3, the transition metal oxide layer 3 contains transition metal oxide powder composed of transition metal oxide particles 10, promoter particles 20 and barrier particles 30. At least some of the transition metal oxide particles 10 and the promoter particles 20 may be in contact with each other. Namely, there may be transition metal oxide particles 10a that are not in contact with the promoter particles, and there may be promoter particles 20a that are not in contact with the transition metal oxide particles. The barrier particles 30 are positioned around peripheries of the transition metal oxide particles and the promoter particles, so as to isolate the transition metal oxide particles and the promoter particles from other particles, and inhibit the movement of the transition metal oxide particles and the promoter particles.

In the transition metal oxide powder shown in FIG. 3, the transition metal oxide particles 10 and the promoter particles 20 are included in various forms within the sections isolated by the barrier particles 30. In FIG. 3, a unit U1 among the plurality of the sections isolated by the barrier particles 30 includes the single promoter particle (primary particle) 20 supporting the single transition metal oxide particle (primary particle) 10. A unit U2 includes an aggregate (secondary particles) of a plurality of the promoter particles 20 supporting the transition metal oxide particles 10. A unit U3 includes the single promoter particle 20 supporting a plurality of the transition metal oxide particles 10.

In the catalyst according to the present embodiment, the single bodies of the transition metal oxide particle and the promoter particle which are the primary particles in contact with each other, or the aggregate in which the secondary particles are in contact with each other are surrounded by the barrier particles. Since at least some of the promoter particles and the transition metal oxide particles are in contact with each other in the catalyst, oxygen is easily released (desorbed) from transition metal oxides due to the action of the promoter particles, so as to promote purification of exhaust gas. In addition, the promoter particles have an effect (anchor effect) to inhibit surface movement and dispersion of the transition metal oxide particles. Therefore, an aggregation of the transition metal oxide particles can be prevented. Moreover, the barrier particles isolate the promoter particles that are in contact with the transition metal oxide particles, which prevents an aggregation of the transition metal oxide particles and the promoter particles caused by heat history. Thus, gaps between the promoter particles that are in contact with the transition metal oxide particles, and gaps between the transition metal oxide particles and the promoter particles can be obtained. Accordingly, exhaust gas can be easily diffused.

Note that, ratios of the barrier particles to the promoter particles that are in contact with the transition metal oxide particles are not necessarily equal, but can be arbitrarily selected. Similarly, ratios of the transition metal oxide particles to the promoter particles are not necessarily equal, but can be arbitrarily selected.

Figure 4:
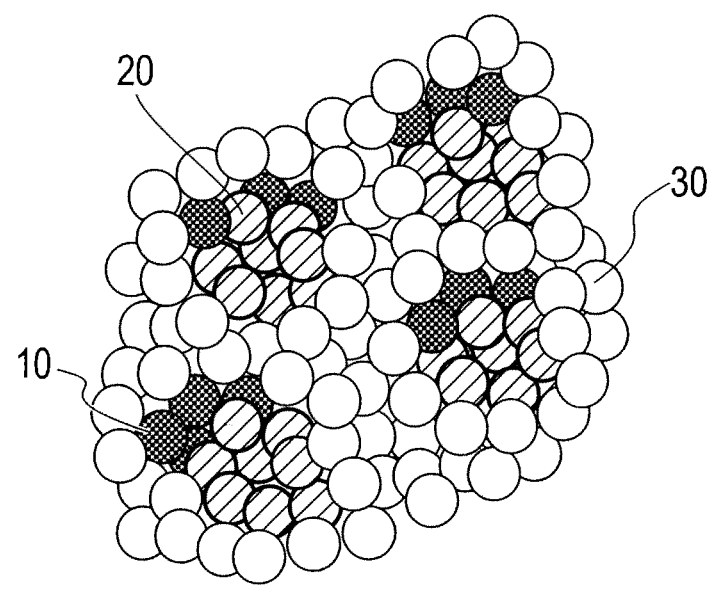
FIG. 4 is a view showing another example of the constitution of the transition metal oxide powder used in the exhaust gas purifying catalyst.

FIG. 4 shows another example of the transition metal oxide powder according to the present embodiment. The transition metal oxide powder shown in FIG. 4 also includes the transition metal oxide particles 10, the promoter particles 20 and the barrier particles 30. The transition metal oxide particles (secondary particles) 10 are supported on the promoter particles (secondary particles) 20. The barrier particles 30 are positioned around the periphery of the promoter particles that support the transition metal oxide particles, so as to isolate the promoter particles and inhibit the movement of promoter particles. Since the promoter particles are in contact with and support the transition metal oxide particles, oxygen is easily released (desorbed) from transition metal oxides (such as iron oxides) due to the promoter particles, which promotes purification of exhaust gas. In addition, the barrier particles isolate the promoter particles that support the transition metal oxide particles, which prevents an aggregation of the transition metal oxide particles and the promoter particles caused by heat history. Moreover, since gaps between the promoter particles that support the transition metal oxide particles can be obtained, exhaust gas can be easily diffused.

Figure 5:
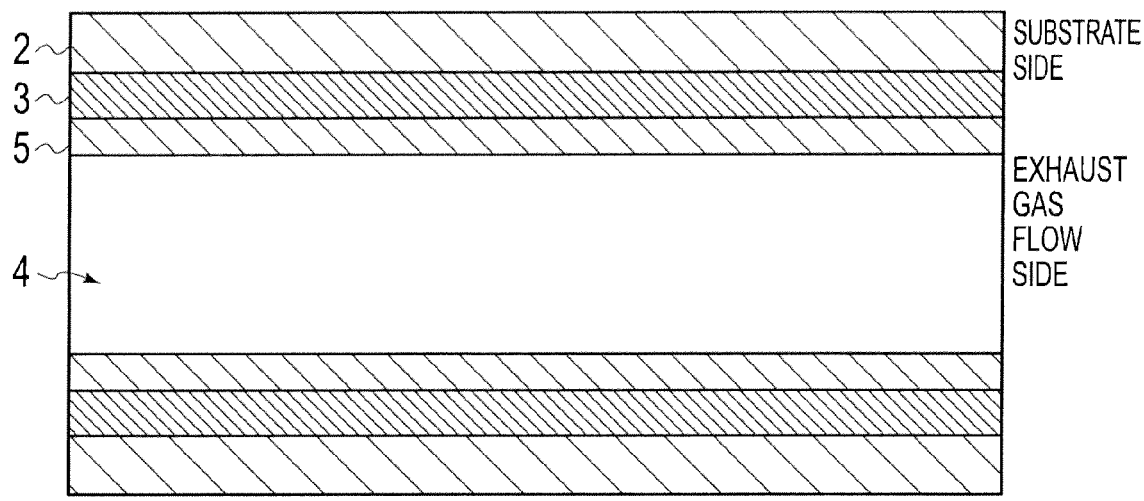
FIG. 5 is an enlarged cross-sectional view showing an example of a constitution of a catalyst layer in the exhaust gas purifying catalyst according to First Embodiment.

As shown in FIG. 5, the exhaust gas purifying catalyst according to the present embodiment may have a structure in which a noble metal layer 5 is further laminated on the transition metal oxide layer 3. Such a lamination structure having the noble metal layer 5 on the transition metal oxide layer 3 promotes initiation of a redox reaction of exhaust gas in the noble metal layer 5. The noble metal layer 5 may include a small amount of noble metal particles since the noble metal particles are used only to accelerate the initiation of the reaction.

Figure 6:
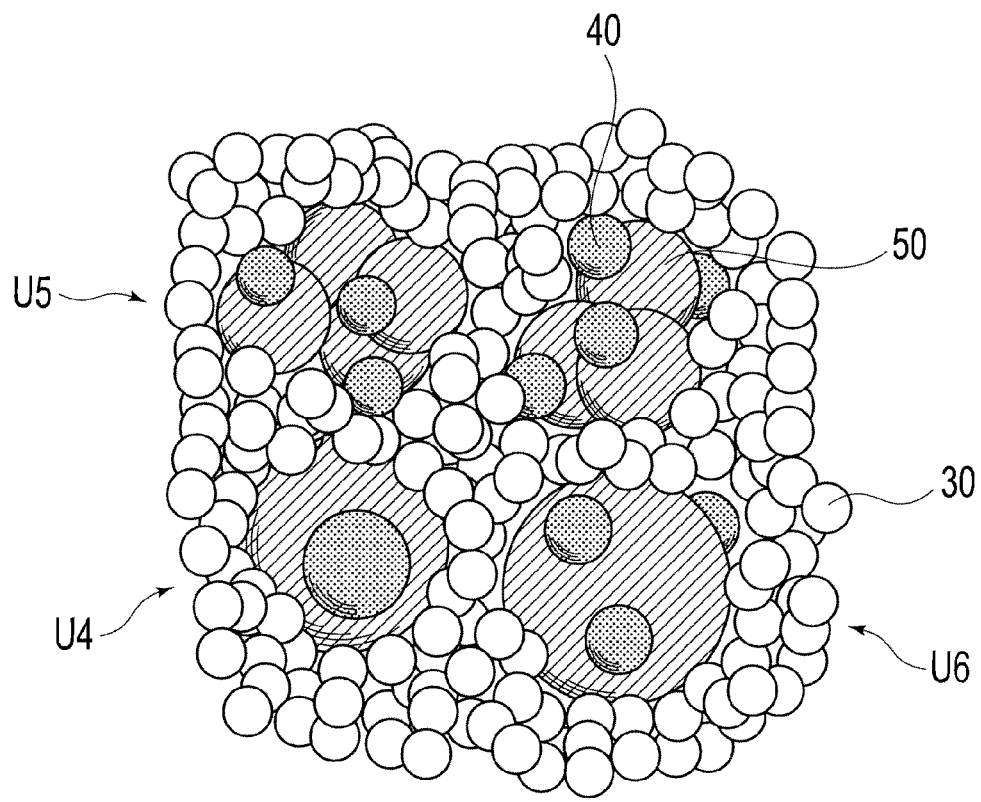
FIG. 6 is a view showing a constitution of noble metal powder used in the exhaust gas purifying catalyst.

FIG. 6 shows an example of noble metal powder according to the present embodiment. The noble metal layer includes noble metal particles 40, anchor particles 50 and the barrier particles 30. The noble metal particles 40 are supported on the anchor particles 50. The barrier particles 30 inhibit the movement of the anchor particles supporting the noble metal particles.

The following is a further detail of the noble metal powder. As the noble metal powder, the powder described in International Publication No. WO 2007/052627 is preferably used. The noble metal powder is composed of the noble metal particles 40, the anchor particles 50 that support the noble metal particles 40, and the barrier particles 30 that surround the single bodies of the noble metal particles 40 and the anchor particles 50 (primary particles) or an aggregate of those (secondary particles). More specifically, the noble metal powder is composed of the noble metal particles 40 that have catalyst activity, the anchor particles 50 that are in contact with the noble metal particles 40 to inhibit the movement of the noble metal particles 40, and the barrier particles 30 that surround the noble metal particles 40 and the anchor particles 50, inhibit the movement of the noble metal particles 40, and prevent an aggregation of the anchor particles 50 caused by the contact between the anchor particles 50. The anchor particles 50 support the noble metal particles 40 on the surfaces thereof.

Since the noble metal particles 40 are in contact with and supported on the anchor particles 50 in the noble metal powder shown in FIG. 6, the anchor particles 50 function as a chemically-connecting anchor material, so as to chemically inhibit the movement of the noble metal particles. Moreover, the barrier particles 30 cover and surround the anchor particles 50 supporting the noble metal particles 40, so as to physically inhibit the movement of the noble metal particles 40. Further, the noble metal particles 40 and the anchor particles 50 are included within sections partitioned by the barrier particles 30. Therefore, an aggregation of the anchor particles 50 by crossing over the sections partitioned by the barrier particles 30 to come in contact with each other can be prevented. Accordingly, the noble metal powder can prevent a decrease in catalyst activity caused by the aggregation of the noble metal particles 40 without increasing manufacturing costs and environmental load. Moreover, the noble metal powder can maintain an effect of activity enhancement of the noble metal particles 40 due to the anchor particles 50.

In the noble metal powder shown in FIG. 6, the noble metal particles 40 and the anchor particles 50 are included in various forms within the sections partitioned by the barrier particles 30. In FIG. 6, a unit U4 among a plurality of the sections partitioned by the barrier particles 30 includes the single anchor particle 50 supporting the single noble metal particle 40. A unit 5 includes an aggregate (secondary particles) of a plurality of the anchor particles 50 supporting the noble metal particles 40. A unit U6 includes the single anchor particle 50 supporting a plurality of the noble metal particles 40.

Preferably, the total amount of the noble metal particles included within each section partitioned by the barrier particles 30 is $8 \times 10^{-20}$ mole or less. Even if the plurality of the noble metal particles included within a single unit, such as the unit U5 and the unit U6, are integrally aggregated due to heat or the like, the aggregated noble metal particle can be controlled to have a particle diameter of 10 nm or less when the amount of the noble metal particles included within the single unit is $8 \times 10^{-20}$ mole or less. Since the surface area of the aggregated noble metal is large enough to achieve sufficient activity when the particle diameter is 10 nm or less, deterioration in activity caused by aggregation can be prevented.

With regard to a particle diameter of the anchor particles 50 included within the section partitioned by the barrier particles 30, the maximum particle diameter is preferably 2 μm. When the particle diameter exceeds 2 μm, it is difficult to suppress an aggregation of the noble metal particles 40 even if the noble metal particles 40 are partitioned by the barrier particles 30. A preferable average particle diameter of the anchor particles 50 is 50 nm or less. When the average particle diameter of the anchor particles 50 exceeds 50 nm, the amount of the noble metal particles 40 supported on the anchor particles 50 increases. As a result, distances between the noble metal particles 40 are shortened, which may cause a promotion of the aggregation of the noble metal particles 40. A more preferable average particle diameter of the anchor particles 50 is 30 nm or less. When the average particle diameter of the anchor particles 50 is 30 nm or less, the aggregation of the noble metal particles 40 can be suppressed more accurately. An optimum range of the average particle diameter of the anchor particles 50 is approximately from 5 nn to 15 nm.

As for the noble metal powder used in the noble metal layer 5, platinum (Pt) is preferably used as the noble metal particles, ceria ($CeO_2$) is preferably used as the anchor particles, and alumina ($Al_2O_3$) is preferably used as the barrier particles that surround platinum and ceria. As another example of the noble metal powder to be used, platinum (Pt) is preferably used as the noble metal particles, a composite oxide of cerium and zirconium ($CeZrO_x$) is preferably used as the anchor particles, and alumina ($Al_2O_3$) is preferably used as the barrier particles. As still another example of the noble metal powder, rhodium (Rh) is preferably used as the noble metal particles, a composite oxide of zirconium and lanthanum is preferably used as the anchor particles, and alumina is preferably used as the barrier particles.

In addition, 80% or more of the noble metal particles 40 in the noble metal powder is preferably in contact with the anchor particles 50. When a ratio of the noble metal particles 40 that are in contact with the anchor particles 50 is less than 80%, a ratio of the noble metal particles 40 not present on the anchor particles is to be 20% or more. As a result, the noble metal particles 40 that are not in contact with the anchor particles 50 move, which may cause an acceleration of sintering between the noble metal particles 40.

Moreover, a transition metal compound composed of at least one element selected from iron (Fe), cobalt (Co), nickel (Ni) and manganese (Mn) may be included within each section partitioned by the barrier particles 30 together with the noble metal particles 40 and the anchor particles 50. Those elements making up the transition metal compound function as a promoter component that further enhances activity of the noble metal particles. Accordingly, such a configuration can drastically improve especially catalyst performance such as activity at low temperature.

The noble metal layer 5 is preferably an uppermost layer in order to come in contact with exhaust gas first. In other words, the noble metal layer 5 preferably faces an exhaust gas flow path 4 as shown in FIG. 5, because the noble metal layer 5 can accelerate the initiation of the reaction with exhaust gas by bringing noble metal into first contact with exhaust gas. Additionally, another layer that has a certain function to purify exhaust gas may be provided between the transition metal oxide layer 3 and the noble metal layer 5.

The following is a further detail of the transition metal oxide particles, promoter particles, the barrier particles, the noble metal particles and the anchor particles, indicating specific substance names.

<Transition Metal Oxide Particles>

Examples of the transition metal oxide particles include oxide particles of iron (Fe), manganese (Mn), nickel (Ni) and cobalt (Co). In addition, oxide particles of two or more of those elements may be arbitrarily mixed. For example, when iron oxide ($Fe_2O_3$) is used as transition metal oxide particles, hydrocarbon (HC) and carbon monoxide (CO) in exhaust gas are oxidized to water ($H_2O$) and carbon dioxide ($CO_2$) due to an emission of oxygen in iron oxide, and $Fe_2O_3$ is reduced to $Fe_3O_4$. This $Fe_3O_4$ is considered to repeatedly introduce oxygen in exhaust gas to bring itself back to $Fe_2O_3$, so as to optimize an oxygen concentration in the catalyst layer. With regard to decomposition of nitrogen oxide (NOx) in exhaust gas, it is considered that a radical of hydrocarbon (HC) and nitrogen oxide (NOx) is generated due to oxygen emitted from $Fe_2O_3$ so as to promote decomposition of nitrogen oxide, namely to activate reaction gas. Thus, it is considered that iron oxide ($Fe_2O_3$) improves catalyst performance, and similar reactions are advanced in oxides of Mn, Co, Ni, and the like.

An average particle diameter of the transition metal oxide particles is preferably 500 nm or less. When the average particle diameter exceeds 500 nm, there is a tendency to be difficult to isolate the transition metal oxide particles from each other by the barrier particles. As a result, catalyst activity may not be ensured because oxide particles are aggregated.

<Promoter Particles>

As for the preferable promoter particles, those that can promote exhaust gas purifying reaction, and the like, in the transition metal oxide particles to be in contact with, and can suppress an aggregation of the transition metal oxide particles may be used. Examples of the promoter particles include oxide particles including cerium, zirconium, praseodymium and lanthanum. More specific examples of those include particles of cerium oxide, a cerium-zirconium composite oxide, praseodymium oxide, a cerium-praseodymium composite oxide, a cerium-lanthanum-zirconium composite oxide, lanthanum oxide and a lanthanum-zirconium composite oxide. In addition, particles of two or more of those compounds may be arbitrarily mixed. Due to those compounds, oxygen is easily emitted from a transition metal oxide so as to ensure catalyst activity.

An average particles diameter of the promoter particles is preferably 500 nm or less. When the average particles diameter exceeds 500 nm, it may be difficult to isolate the promoter particles by the barrier particles. As a result, catalyst activity may be reduced because the promoter particles themselves are aggregated or the transition metal oxide particles in contact with the promoter particles are aggregated.

<Barrier Particles>

As for the barrier particles, alumina or silicon dioxide is preferable. Other than those, a mixture of alumina and silicon dioxide or a composite compound of alumina and silicon dioxide may be used. Examples of the composite compound of alumina and silicon dioxide include mullite ($3Al_2O_3 \cdot 2SiO_2$) and zeolite. As for the barrier particles for the noble metal particles and the anchor particles, an oxide containing zirconium (Zr) (zirconia ($ZrO_2$)) may be used in addition to the above-mentioned compounds. In addition, lanthanum (La) may be included in the barrier particles.

An average particles diameter of the barrier particles is preferably 500 nm or less. When the average particles diameter exceeds 500 nm, it may be difficult to isolate the transition metal oxide particles, the promoter particles and the anchor particles by the barrier particles. As a result, the transition metal oxide particles, the promoter particles and the anchor particles come out from the gaps of the barrier particles, which causes the aggregation between the transition metal oxide particles, between the promoter particles and between the anchor particles, respectively, and reduces catalyst activity. The respective average particle diameters (median diameters, D50) of the transition metal oxide particles, the promoter particles and the barrier particles may be obtained by use of a dynamic light scattering type particle size distribution measuring device.

<Noble Metal Particles>

Examples of the noble metal particles include particles of rhodium (Rh), platinum (Pt) and palladium (Pd). In addition, particles of two or more of those elements may be arbitrarily mixed. Particularly, the noble metal layer preferably includes the particles of rhodium (Rh). This is because rhodium especially has small activation energy among noble metal, and greatly accelerates initiation of catalyst activity of a transition metal oxide in an exhaust gas purifying catalyst. An additional catalyst layer containing platinum and palladium may be disposed under the layer including rhodium particles.

An average particle diameter of the noble metal particles is preferably between 2 nm and 10 nm, more preferably between 2 nm and 5 nm. When the average particle diameter is less than 2 nm, durability of the noble metal particles themselves may be deteriorated, and sintering of noble metal may be accelerated caused by the movement of the noble metal particles themselves. When the average particle diameter exceeds 10 nm, reactivity with exhaust gas is lowered, and enhancement of noble metal activity may not be achieved.

<Anchor Particles>

As for the anchor particles 50, an oxide containing cerium (Ce) is preferable. Since such an oxide is known as an oxide that has an oxygen storage capacity and is easily coupled to the noble metal particles 40, especially platinum particles, an anchor effect can be further achieved. As for the oxide containing cerium, ceria ($CeO_2$) and a composite oxide of cerium and zirconium (Zr) are preferable. Alternatively, an oxide of zirconium may be also used as the anchor particles 50. When rhodium is used as noble metal, an aggregation of rhodium can be further suppressed by supporting rhodium on zirconium. When zirconium is used as the anchor particles 50, a rare earth element such as lanthanum may be added to the anchor particles 50 so as to improve heat resistance.

The average particle diameter of the anchor particles is preferably 30 nm or less. When the average particle diameter exceeds 30 nm, the noble metal particles supported on the anchor particles increase. As a result, sintering of noble metal may be accelerated caused by the movement of the noble metal particles on the anchor particles. The particle diameters of the noble metal particles and the anchor particles can be obtained by observing the respective particles by use of a transmission electron microscope (TEM). The average particle diameters of those can be obtained by an arithmetic average by measuring particle diameters of a plurality of particles.

(Method for Manufacturing Exhaust Gas Purifying Catalyst)

A method for manufacturing the exhaust gas purifying catalyst according to the present embodiment includes processes of preparing transition metal oxide powder, slurrying the transition metal oxide powder, applying the slurry on a monolithic substrate, and drying and baking the substrate, thereby forming a transition metal oxide layer.

In addition, the transition metal oxide powder may be prepared by the following processes (1) to (4): (1) the transition metal oxide particles are slurried so as to prepare transition metal oxide slurry; (2) the promoter particles are slurried so as to prepare promoter slurry; (3) the barrier particles or a precursor of the barrier particles are dispersed in water to be slurried so as to prepare barrier slurry; and (4) the transition metal oxide slurry and the promoter slurry are dispersed in the barrier slurry, followed by drying and baking.

The following is a further detail of the preparation method of the transition metal oxide powder. First, the transition metal oxide particles are dispersed in a solvent and milled to have a secondary particle diameter of 500 nm or less, so as to prepare transition metal oxide slurry. Then, the promoter particles are dispersed in solvent and milled to have a secondary particle diameter of 500 nm or less, so as to prepare promoter slurry. Then, the transition metal oxide slurry and the promoter slurry are mixed to prepare mixed slurry. As for the milling process, bead milling may be employed.

Next, slurry in which a precursor of the barrier particles is dispersed in a solvent is additionally prepared. As for the precursor, boehmite may be used when the barrier particles are alumina, and zirconium nitrate may be used when the barrier particles are zirconia. Then, the mixed slurry and the precursor slurry are mixed, followed by stirring the mixture at high speed, so as to surround the transition metal oxide particles and the promoter particles with the precursor of the barrier particles. Then, the slurry of the transition metal oxide particles and the promoter particles surrounded with the precursor is dried and baked, thereby obtaining the transition metal oxide powder.

Instead of the precursor, slurry prepared by milling the barrier particles by a bead mill may be used. Specifically, the barrier particles such as alumina, silica and mullite are milled by a head mill to have a size of 500 nm or less, more particularly approximately between 60 nm and 150 nm, so as to prepare barrier slurry. Then, the barrier slurry and the mixed slurry are mixed, followed by stirring the mixture at high speed, so as to surround the transition metal oxide particles and the promoter particles with the barrier particles. Then, the slurry of the transition metal oxide particles and the promoter particles surrounded with the barrier particles is dried and baked, thereby obtaining the transition metal oxide powder.

Moreover, the transition metal oxide powder may be prepared by the following processes (1) to (3): (1) the transition metal oxide particles are supported on the promoter particles, and then, the promoter particles are slurried to prepare promoter slurry; (2) the barrier particles or a precursor of the barrier particles are dispersed in water to be slurried so as to prepare barrier slurry; and (3) the promoter slurry is dispersed in the barrier slurry, followed by drying and baking.

The following is a further detail of the preparation method of the transition metal oxide powder. First, the promoter particles are dispersed in a solvent and milled to have a secondary particle diameter of 500 nm or less, so as to prepare promoter slurry. Then, a precursor solution of a transition metal oxide is put in the slurry of the promoter particles so as to support the precursor of the transition metal oxide on a surface of the promoter particles. Then, the solution is dried and baked, thereby obtaining the promoter particles supporting the transition metal oxide. As for the precursor solution of the transition metal oxide, an iron nitrate solution, a manganese nitrate solution, a nickel nitrate solution and a cobalt nitrate solution may be used.

Then, the promoter particles are dispersed in a solvent to be slurried so as to prepare promoter slurry. The promoter slurry is dispersed in the barrier slurry, followed by drying and baking, thereby obtaining the transition metal oxide powder.

In the method for manufacturing the exhaust gas purifying catalyst according to the present embodiment, noble metal powder is prepared, the noble metal powder is slurried to be applied on the transition metal oxide layer, followed by drying and baking, so as to form a noble metal layer.

The noble metal oxide powder may be prepared by the following processes (1) to (3): (1) the noble metal particles are supported on the anchor particles, and then, the anchor particles are slurried to prepare noble metal slurry; (2) the barrier particles or a precursor of the barrier particles are dispersed in water to be slurried so as to prepare barrier slurry; and (3) the noble metal slurry is dispersed in the barrier slurry, followed by drying and baking.

The following is a further description of the preparation method of the noble metal powder. Basically, the manufacturing method described in International Publication No. WO 2007/052627 may be employed. Specifically, an aggregate, in which the anchor particles having an average primary particle diameter of 30 nm or less are aggregated to have a secondary particle diameter of approximately 2 μm, is dispersed in a solvent, and milled to have the secondary particle diameter of 500 nm or less, more particularly approximately between 100 nm and 300 nm, so as to prepare slurry including the anchor particles of which a fine particle size is 500 nm or less, preferably between 100 nm and 300 nm. As for the milling process, bead milling may be employed. Then, a noble metal-containing solution is put in the slurry of the anchor particles, followed by stirring the mixture at high speed, so as to support noble metal on the anchor particles.

Next, slurry in which a precursor of the barrier particles is dispersed in a solvent is additionally prepared. As for the precursor, boehmite may be used when the barrier particles are alumina, and zirconium nitrate may be used when the barrier particles are zirconia. Then, the slurry of the anchor particles supporting noble metal and the precursor slurry are mixed, followed by stirring the mixture at high speed, so as to surround the anchor particles with the precursor of the barrier particles. Then, the slurry of the anchor particles surrounded with the precursor is dried and baked, thereby obtaining the noble metal powder. Similar to the preparation method of the transition metal oxide particles, instead of the precursor, slurry prepared by milling the barrier particles by a bead mill may be used.

Then, the obtained transition metal oxide powder and a binder are mixed to be slurried, so as to prepare transition metal oxide slurry. Similarly, the obtained noble metal powder and a binder are mixed to be slurried, so as to prepare noble metal slurry. Then, the transition metal oxide slurry and the noble metal slurry are applied to a substrate, followed by drying and baking, thereby obtaining the exhaust gas purifying catalyst.

(Exhaust Gas Purifying Catalyst System)

The following is a description of an exhaust gas purifying catalyst system according to the present embodiment. The exhaust gas purifying catalyst system according to the present embodiment includes the above-described exhaust gas purifying catalyst, which is provided at a position into which exhaust gas flowing out of an internal combustion engine flows. A specific example of the "position into which exhaust gas flowing out of an internal combustion engine flows" includes a so-called outlet of an exhaust manifold. Due to the exhaust gas purifying catalyst provided immediately below an internal combustion engine, earlier catalyst activation can be ensured. In addition, another catalyst, such as a three-way catalyst, may be provided between the exhaust manifold and the exhaust gas purifying catalyst. In such a case, the exhaust gas purifying catalyst may be installed under a floor of a vehicle.

The following is a further description of the present embodiment referring to examples and comparative examples. However, the present invention is not limited to these examples.

Example I-1

As promoter particles, a cerium-zirconium composite oxide having an average primary particle diameter of 30 nm was used. A ratio by weight of cerium oxide to zirconium oxide ($CeO_2:ZrO_2$) in the cerium-zirconium composite oxide was 78:22. The particles were impregnated with an iron nitrate solution, followed by drying and baking, so as to prepare the cerium-zirconium composite oxide supporting 20% of iron oxide ($Fe_2O_3$). Then, the iron oxide-supporting cerium-zirconium composite oxide was dispersed in water and milled by a bead mill to have an average particle diameter of 150 nm, thereby preparing cerium-zirconium composite oxide particles A.

Next, as barrier particles, 118.5 g of cubic boehmite (20 nm×20 nm×60 nm) containing 24% of moisture was prepared. This boehmite was put into a beaker and dispersed in water, and adjusted to be pH 4 by nitric acid. 90 g of the cerium-zirconium composite oxide particles A (as a solid content) was added to the boehmite slurry, followed by dispersing the mixture by stirring at high speed. Then, the slurry was dried and baked to prepare powder a-1 in which the cerium-zirconium composite oxide particles A were isolated by alumina.

Next, 159.1 g of the powder a-1, 15.9 g of boehmite alumina, 307.5 g of water and 17.5 g of a 10% nitric acid solution were put into a ball mill. The powder a-1 was milled so as to prepare slurry a-1 having an average particle diameter of 3 μm.

Then, the slurry a-1 was applied to a monolithic substrate (volume of 0.04 L) having a diameter φ of 36 mm, 600 cells and 4 mils, followed by drying and baking. Thus, a sample of Example I-1 in which 440 g/L of a transition metal oxide layer was provided in the monolithic substrate was prepared. The obtained sample of Example I-1 is a catalyst supporting 40 g/L of iron oxide ($Fe_2O_3$). As a result of an analysis by use of an X-ray diffractometer, the iron oxide ($Fe_2O_3$) was $\alpha Fe_2O_3$.

Example I-2

The promoter particles similar to Example I-1 were impregnated with a manganese nitrate solution, followed by drying and baking, so as to prepare a cerium-zirconium composite oxide supporting 20% of manganese dioxide ($MnO_2$). Then, the manganese dioxide-supporting cerium-zirconium composite oxide was dispersed in water and milled by a bead mill to have an average particle diameter of 150 nm, thereby preparing cerium-zirconium composite oxide particles B.

Next, boehmite similar to Example I-1 was used as barrier particles. 118.5 g of boehmite was put into a beaker and dispersed in water, and adjusted to be pH 4 by nitric acid. 90 g of the cerium-zirconium composite oxide particles B (as a solid content) was added to the boehmite slurry, followed by dispersing the mixture by stirring at high speed. Then, the slurry was dried and baked to prepare powder b-1 in which the cerium-zirconium composite oxide particles B were isolated by alumina.

Next, 159.1 g of the powder b-1, 15.9 g of boehmite alumina, 307.5 g of water and 17.5 g of a 10% nitric acid solution were put into a ball mill. The powder b-1 was milled so as to prepare slurry b-1 having an average particle diameter of 3 μm.

Then, the slurry b-1 was applied to the monolithic substrate similar to Example I-1, followed by drying and baking. Thus, a sample of Example I-2 in which 440 g/L of a transition metal oxide layer was provided in the monolithic substrate was prepared. The obtained sample of Example I-2 is a catalyst supporting 40 g/L of manganese oxide ($MnO_2$).

Example I-3

The promoter particles similar to Example I-1 were impregnated with a nickel nitrate solution, followed by drying and baking, so as to prepare a cerium-zirconium composite oxide supporting 20% of nickel oxide (NiO). Then, the nickel oxide-supporting cerium-zirconium composite oxide was dispersed in water and milled by a bead mill to have an average particle diameter of 150 nm, thereby preparing cerium-zirconium composite oxide particles C.

Next, boehmite similar to Example I-1 was used as barrier particles. 118.5 g of boehmite was put into a beaker and dispersed in water, and adjusted to be pH 4 by nitric acid. 90 g of the cerium-zirconium composite oxide particles C (as a solid content) was added to the boehmite slurry, followed by dispersing the mixture by stirring at high speed. Then, the slurry was dried and baked to prepare powder c-1 in which the cerium-zirconium composite oxide particles C were isolated by alumina.

Next, 159.1 g of the powder c-1, 15.9 g of boehmite alumina, 307.5 g of water and 17.5 g of a 10% nitric acid solution were put into a ball mill. The powder c-1 was milled so as to prepare slurry c-1 having an average particle diameter of 3 μm.

Then, the slurry c-1 was applied to the monolithic substrate similar to Example I-1, followed by drying and baking. Thus, a sample of Example I-3 in which 440 g/L of a transition metal oxide layer was provided in the monolithic substrate was prepared. The obtained sample of Example I-3 is a catalyst supporting 40 g/L of nickel oxide (NiO).

Example I-4

The promoter particles similar to Example I-1 were impregnated with a cobalt nitrate solution, followed by drying and baking, so as to prepare a cerium-zirconium composite oxide supporting 20% of cobalt oxide ($CO_2O_3$). Then, the cobalt oxide-supporting cerium-zirconium composite oxide was dispersed in water and milled by a bead mill to have an average particle diameter of 150 nm, thereby preparing cerium-zirconium composite oxide particles D.

Next, boehmite similar to Example I-1 was used as barrier particles. 118.5 g of boehmite was put into a beaker and dispersed in water, and adjusted to be pH 4 by nitric acid. 90 g of the cerium-zirconium composite oxide particles D (as a solid content) was added to the boehmite slurry, followed by dispersing the mixture by stirring at high speed. Then, the slurry was dried and baked to prepare powder d-1 in which the cerium-zirconium composite oxide particles D were isolated by alumina.

Next, 159.1 g of the powder d-1, 15.9 g of boehmite alumina, 307.5 g of water and 17.5 g of a 10% nitric acid solution were put into a ball mill. The powder d-1 was milled so as to prepare slurry d-1 having an average particle diameter of 3 μm.

Then, the slurry d-1 was applied to the monolithic substrate similar to Example I-1, followed by drying and baking. Thus, a sample of Example I-4 in which 440 g/L of a transition metal oxide layer was provided in the monolithic substrate was prepared. The obtained sample of Example I-4 is a catalyst supporting 40 g/L of cobalt oxide ($CO_2O_3$).

Example I-5

First, the cerium-zirconium composite oxide particles A similar to Example I-1 were prepared. Next, mesoporous silica of which a BET specific surface area was 630 was used as barrier particles. The mesoporous silica was dispersed in water to prepare slurry. Then, the slurry in which the mesoporous silica was dispersed was milled to prepare slurry having an average particle diameter of 150 nm. This slurry containing 90 g of silica was divided, into which 90 g of the cerium-zirconium composite oxide particles A was added as a solid content, followed by dispersing the mixture by stirring at high speed. Then, the slurry was dried and baked to prepare powder e-1 in which the cerium-zirconium composite oxide particles A were isolated by silica.

Next, 159.1 g of the powder e-1, 79.5 g of silica sol (20% of silica), 243.9 g of water and 17.5 g of a 10% nitric acid solution were put into a ball mill. The powder e-1 was milled so as to prepare slurry e-1 having an average particle diameter of 3 μm.

Then, the slurry e-1 was applied to the monolithic substrate similar to Example I-1, followed by drying and baking. Thus, a sample of Example I-5 in which 440 g/L of a transition metal oxide layer was provided in the monolithic substrate was prepared. The obtained sample of Example I-5 is a catalyst supporting 40 g/L of iron oxide ($Fe_2O_3$). As a result of the analysis by use of the X-ray diffractometer, the iron oxide ($Fe_2O_3$) was $\alpha Fe_2O_3$.

Example I-6

First, the cerium-zirconium composite oxide particles A similar to Example I-1 were prepared. Next, mesoporous silica of which a BET specific surface area was 630 m$^2$/g was used as barrier particles. The mesoporous silica was dispersed in water to prepare slurry. Then, the slurry in which the mesoporous silica was dispersed was milled by a bead mill to prepare slurry having an average particle diameter of 150 nm. Then, as the barrier particles, 59.2 g of cubic boehmite (20 nm×20 nm×60 nm) (containing 24% of moisture) was put into a beaker and dispersed in water, and adjusted to be pH 4 by nitric acid. Then, the milled slurry in which 45 g of the mesoporous silica was dispersed was added to the boehmite-dispersed water, followed by stirring.

The alumina-silica-mixed slurry containing 90 g of the solid content was used, into which 90 g of the cerium-zirconium composite oxide particles A was added as a solid content, followed by dispersing the mixture by stirring at high speed. Then, the slurry was dried and baked to prepare powder f-1 in which the cerium-zirconium composite oxide particles A were isolated by the mixture of alumina and silica.

Next, 159.1 g of the powder f-1, 15.9 g of boehmite alumina, 307.5 g of water and 17.5 g of a 10% nitric acid solution were put into a ball mill. The powder f-1 was milled so as to prepare slurry f-1 having an average particle diameter of 3 μm.

Then, the slurry f-1 was applied to the monolithic substrate similar to Example I-1, followed by drying and baking. Thus, a sample of Example I-6 in which 440 g/L of a transition metal oxide layer was provided in the monolithic substrate was prepared. The obtained sample of Example I-6 is a catalyst supporting 40 g/L of iron oxide ($Fe_2O_3$). As a result of the analysis by use of the X-ray diffractometer, the iron oxide ($Fe_2O_3$) was $\alpha Fe_2O_3$.

Example I-7

First, the cerium-zirconium composite oxide particles A similar to Example I-1 were prepared. Next, mullite ($3Al_2O_3 \cdot 2SiO_2$) was used as barrier particles, and the mullite was dispersed in water to prepare slurry. Then, the slurry in which mullite was dispersed was milled by a bead mill to prepare slurry having an average particle diameter of 150 nm. Then, the mullite-dispersing slurry containing 90 g of mullite (solid content) was used, into which 90 g of the cerium-zirconium composite oxide particles A was added as a solid content, followed by dispersing the mixture by stirring at high speed. Then, the slurry was dried and baked to prepare powder g-1 in which the cerium-zirconium composite oxide particles A were isolated by mullite (alumina-silica compound).

Next, 159.1 g of the powder g-1, 15.9 g of boehmite alumina, 307.5 g of water and 17.5 g of a 10% nitric acid solution were put into a ball mill. The powder g-1 was milled so as to prepare slurry g-1 having an average particle diameter of 3 μm.

Then, the slurry g-1 was applied to the monolithic substrate similar to Example I-1, followed by drying and baking. Thus, a sample of Example I-7 in which 440 g/L of a transition metal oxide layer was provided in the monolithic substrate was prepared. The obtained sample of Example I-7 is a catalyst supporting 40 g/L of iron oxide ($Fe_2O_3$). As a result of the analysis by use of the X-ray diffractometer, the iron oxide ($Fe_2O_3$) was $\alpha Fe_2O_3$.

Example I-8

The promoter particles similar to Example I-1 were impregnated with an iron nitrate solution, followed by drying and baking at 400° C., so as to prepare a cerium-zirconium composite oxide supporting 20% of iron oxide ($Fe_2O_3$). Then, the prepared iron oxide-supporting cerium-zirconium composite oxide was dispersed in water and milled by a bead mill to have an average particle diameter of 150 nm, thereby preparing cerium-zirconium composite oxide particles H.

Next, boehmite similar to Example I-1 was used as barrier particles. 118.5 g of boehmite was put into a beaker and dispersed in water, and adjusted to be pH 4 by nitric acid. 90 g of the cerium-zirconium composite oxide particles H (as a solid content) was added to the boehmite slurry, followed by dispersing the mixture by stirring at high speed. Then, the slurry was dried and baked to prepare powder h-1 in which the cerium-zirconium composite oxide particles H were isolated by alumina.

Next, 159.1 g of the powder h-1, 15.9 g of boehmite alumina, 307.5 g of water and 17.5 g of a 10% nitric acid solution, were put into a ball mill. The powder h-1 was milled so as to prepare slurry h-1 having an average particle diameter of 3 μm.

Then, the slurry h-1 was applied to the monolithic substrate similar to Example I-1, followed by drying and baking. Thus, a sample of Example I-8 in which 440 g/L of a transition metal oxide layer was provided in the monolithic substrate was prepared. The obtained sample of Example I-8 is a catalyst supporting 40 g/L of iron oxide ($Fe_2O_3$). As a result of the analysis by use of the X-ray diffractometer, the iron oxide ($Fe_2O_3$) was $\gamma Fe_2O_3$.

Example I-9

Cerium oxide was used as promoter particles to prepare particles in contact with iron oxide. Specifically, a cerium nitrate solution and an iron nitrate solution were mixed so that a ratio by weight of cerium oxide ($CeO_2$):iron oxide ($Fe_2O_3$) was to be 80:20. Next, ammonia water was added to the mixed solution and adjusted to be pH 9.5, thereby producing a precipitate of cerium hydroxide and iron hydroxide. The precipitate was filtered, washed and dried, followed by baking, so as to prepare cerium oxide in contact with 20% of iron oxide ($Fe_2O_3$). Then, iron oxide-supporting cerium oxide was dispersed in water and milled by a bead mill to have an average particle diameter of 100 nm, thereby preparing cerium oxide particles I.

Next, boehmite similar to Example I-1 was used as barrier particles. 118.5 g of boehmite was put into a beaker and dispersed in water, and adjusted to be pH 4 by nitric acid. 90 g of the cerium oxide particles I (as a solid content) was added to the boehmite slurry, followed by dispersing the mixture by stirring at high speed. Then, the slurry was dried and baked to prepare powder i-1 in which the cerium oxide particles I were isolated by alumina.

Next, 159.1 g of the powder i-1, 15.9 g of boehmite alumina, 307.5 g of water and 17.5 g of a 10% nitric acid solution were put into a ball mill. The powder i-1 was milled so as to prepare slurry i-1 having an average particle diameter of 3 μm.

Then, the slurry i-1 was applied to the monolithic substrate similar to Example I-1, followed by drying and baking. Thus, a sample of Example I-9 in which 440 g/L of a transition metal oxide layer was provided in the monolithic substrate was prepared. The obtained sample of Example I-9 is a catalyst supporting 40 g/L of iron oxide ($Fe_2O_3$). As a result of the analysis by use of the X-ray diffractometer, the iron oxide ($Fe_2O_3$) was $\alpha Fe_2O_3$.

Example I-10

Praseodymium oxide ($Pr_6O_{11}$) was used as promoter particles. The praseodymium oxide was impregnated with an iron nitrate solution, followed by drying and baking at 400° C., so as to prepare praseodymium oxide supporting 20% of iron oxide ($Fe_2O_3$). Then, the iron oxide-supporting praseodymium oxide was dispersed in water and milled by a bead mill to have an average particle diameter of 150 nm, thereby preparing praseodymium oxide particles J.

Next, boehmite similar to Example I-1 was used as barrier particles. 118.5 g of boehmite was put into a beaker and dispersed in water, and adjusted to be pH 4 by nitric acid. 90 g of the praseodymium oxide particles J (as a solid content) was added to the boehmite slurry, followed by stirring the mixture at high speed. Then, the slurry was dried and baked to prepare powder j-1 in which the praseodymium oxide particles J were isolated by alumina.

Next, 159.1 g of the powder j-1, 15.9 g of boehmite alumina, 307.5 g of water and 17.5 g of a 10% nitric acid solution were put into a ball mill. The powder j-1 was milled so as to prepare slurry j-1 having an average particle diameter of 3 µm.

Then, the slurry j-1 was applied to the monolithic substrate similar to Example I-1, followed by drying and baking. Thus, a sample of Example I-10 in which 440 g/L of a transition metal oxide layer was provided in the monolithic substrate was prepared. The obtained sample of Example I-10 is a catalyst supporting 40 g/L of iron oxide ($Fe_2O_3$). As a result of the analysis by use of the X-ray diffractometer, the iron oxide ($Fe_2O_3$) was $\alpha Fe_2O_3$.

Example I-11

First, the promoter particles similar to Example I-1 were dispersed in water and milled by a bead mill to have an average particle diameter of 150 nm. Next, iron oxide powder ($\alpha Fe_2O_3$) was dispersed in water and milled by a bead mill to have an average particle diameter of 500 nm. Then, the slurry containing 72 g of the cerium-zirconium composite oxide as a solid content and the iron oxide slurry containing 18 g of a solid content were stirred at high speed to prepare mixed slurry.

Next, boehmite similar to Example I-1 was used as barrier particles. 118.5 g of boehmite was put into a beaker and dispersed in water, and adjusted to be pH 4 by nitric acid. The mixed slurry containing 90 g of a solid content was added to the boehmite slurry, followed by dispersing the mixture by stirring at high speed. Then, the slurry was dried and baked to prepare powder k-1 in which the cerium-zirconium composite oxide particles were isolated by alumina.

Next, 159.1 g of the powder k-1, 15.9 g of boehmite alumina, 307.5 g of water and 17.5 g of a 10% nitric acid solution were put into a ball mill. The powder k-1 was milled so as to prepare slurry k-1 having an average particle diameter of 3 µm.

Then, the slurry k-1 was applied to the monolithic substrate similar to Example I-1, followed by drying and baking. Thus, a sample of Example I-11 in which 440 g/L of a transition metal oxide layer was provided in the monolithic substrate was prepared. The obtained sample of Example I-11 is a catalyst supporting 40 g/L of iron oxide ($\alpha Fe_2O_3$).

Example I-12

First, the promoter particles similar to Example I-1 were dispersed in water and milled by a bead mill to have an average particle diameter of 500 nm. Next, iron oxide powder ($\alpha Fe_2O_3$) was dispersed in water and milled by a bead mill to have an average particle diameter of 150 nm. Then, the slurry containing 72 g of the cerium-zirconium composite oxide as a solid content and the iron oxide slurry containing 18 g of a solid content were stirred at high speed to prepare mixed slurry.

Next, boehmite similar to Example I-1 was used as barrier particles. 118.5 g of boehmite was put into a beaker and dispersed in water, and adjusted to be pH 4 by nitric acid. The mixed slurry containing 90 g of a solid content was added to the boehmite slurry, followed by dispersing the mixture by stirring at high speed. Then, the slurry was dried and baked to prepare powder l-1 in which the cerium-zirconium composite oxide particles were isolated by alumina.

Next, 159.1 g of the powder l-1, 15.9 g of boehmite alumina, 307.5 g of water and 17.5 g of a 10% nitric acid solution were put into a ball mill. The powder l-1 was milled so as to prepare slurry l-1 having an average particle diameter of 3 µm.

Then, the slurry l-1 was applied to the monolithic substrate similar to Example I-1, followed by drying and baking. Thus, a sample of Example I-12 in which 440 g/L of a transition metal oxide layer was provided in the monolithic substrate was prepared. The obtained sample of Example I-12 is a catalyst supporting 40 g/L of iron oxide ($\alpha Fe_2O_3$).

Example I-13

The promoter particles similar to Example I-1 were impregnated with an iron nitrate solution, followed by drying and baking, so as to prepare a cerium-zirconium composite oxide supporting 20% of iron oxide ($Fe_2O_3$). Then, the iron oxide-supporting cerium-zirconium composite oxide was dispersed in water and milled by a bead mill to have an average particle diameter of 150 nm, thereby preparing the cerium-zirconium composite oxide particles A.

Next, 90 g of γ-alumina powder as barrier particles was dispersed in water and adjusted to be pH 4, followed by milling by a bead mill to have an average particle diameter of 500 nm. Then, 90 g of the cerium-zirconium composite oxide particles A (as a solid content) was added to the alumina slurry, followed by dispersing the mixture by stirring at high speed. Then, the slurry was dried and baked to prepare powder m-1 in which the cerium-zirconium composite oxide particles A were isolated by alumina.

Next, 159.1 g of the powder m-1, 15.9 g of boehmite alumina, 307.5 g of water and 17.5 g of a 10% nitric acid solution were put into a ball mill. The powder m-1 was milled so as to prepare slurry m-1 having an average particle diameter of 3 µm.

Then, the slurry m-1 was applied to the monolithic substrate similar to Example I-1, followed by drying and baking. Thus, a sample of Example I-13 in which 440 g/L of a transition metal oxide layer was provided in the monolithic substrate was prepared. The obtained sample of Example I-13 is a catalyst supporting 40 g/L of iron oxide ($\alpha Fe_2O_3$).

Example I-14

The promoter particles similar to Example I-1 were impregnated with an iron nitrate solution, followed by drying and baking, so as to prepare a cerium-zirconium composite oxide supporting 26.7% of iron oxide ($Fe_2O_3$). Then, the iron oxide-supporting cerium-zirconium composite oxide was dispersed in water and milled by a head mill to have an average particle diameter of 150 nm, thereby preparing cerium-zirconium composite oxide particles Aa.

Next, boehmite similar to Example I-1 was used as barrier particles. 118.5 g of boehmite was put into a beaker and dispersed in water, and adjusted to be pH 4 by nitric acid. 135 g of the cerium-zirconium composite oxide particles Aa (as a solid content) was added to the boehmite slurry, followed by dispersing the mixture by stirring at high speed. Then, the slurry was dried and baked to prepare powder aa-1 in which the cerium-zirconium composite oxide particles Aa were isolated by alumina.

Next, 159.1 g of the powder aa-1, 15.9 g of boehmite alumina, 307.5 g of water and 17.5 g of a 10% nitric acid solution were put into a ball mill. The powder aa-1 was milled so as to prepare slurry aa-1 having an average particle diameter of 3 μm.

Next, zirconium-lanthanum composite oxide particles having an average particle diameter of 20 nm as anchor particles were impregnated with rhodium nitrate to prepare particles X supporting 0.17% of rhodium. A ratio by weight of zirconium oxide to lanthanum oxide ($ZrO_2:La_2O_3$) in the zirconium-lanthanum composite oxide was 97:3. Then, 50.8 g of boehmite similar to Example I-1 was put into a beaker and dispersed in water, and adjusted to be pH 4 by nitric acid. 90 g of the particles X was added to the boehmite slurry, followed by dispersing the mixture by stirring at high speed. Then, the slurry was dried and baked to prepare powder x-1 in which the particles X were isolated by alumina.

Next, 159.1 g of the powder x-1, 15.9 g of boehmite alumina, 307.5 g of water and 17.5 g of a 10% nitric acid solution were put into a ball mill. The powder x-1 was milled so as to prepare slurry x-1 having an average particle diameter of 3 μm.

Then, the slurry aa-1 was applied to the monolithic substrate similar to Example I-1, followed by drying and baking, so as to form 275 g/L of a transition metal oxide layer. In addition, the slurry x-1 was applied on the transition metal oxide layer, followed by drying and baking, so as to form 55 g/L of a noble metal layer. A sample of Example I-14 thus obtained is a catalyst supporting 40 g/L of iron oxide ($Fe_2O_3$) and 0.06 g/L of rhodium. As a result of the analysis by use of the X-ray diffractometer, the iron oxide ($Fe_2O_3$) was $\alpha Fe_2O_3$.

Example I-15

The promoter particles similar to Example I-1 were impregnated with a manganese nitrate solution, followed by drying and baking, so as to prepare a cerium-zirconium composite oxide supporting 26.7% of manganese dioxide ($MnO_2$). Then, the manganese dioxide-supporting cerium-zirconium composite oxide was dispersed in water and milled by a bead mill to have an average particle diameter of 150 nm, thereby preparing cerium-zirconium composite oxide particles Bb.

Next, boehmite similar to Example I-1 was used as barrier particles. 118.5 g of boehmite was put into a beaker and dispersed in water, and adjusted to be pH 4 by nitric acid. 135 g of the cerium-zirconium composite oxide particles Bb (as a solid content) was added to the boehmite slurry, followed by dispersing the mixture by stirring at high speed. Then, the slurry was dried and baked to prepare powder bb-1 in which the cerium-zirconium composite oxide particles Bb were isolated by alumina.

Next, 159.1 g of the powder bb-1, 15.9 g of boehmite alumina, 307.5 g of water and 17.5 g of a 10% nitric acid solution were put into a ball mill. The powder bb-1 was milled so as to prepare slurry bb-1 having an average particle diameter of 3 μm.

Then, the slurry bb-1 was applied to the monolithic substrate similar to Example I-1, followed by drying and baking, so as to form 275 g/L of a transition metal oxide layer. In addition, the slurry x-1 obtained in Example I-14 was applied on the transition metal oxide layer, followed by drying and baking, so as to form 55 g/L of a noble metal layer. A sample of Example I-15 thus obtained is a catalyst supporting 40 g/L of manganese oxide ($MnO_2$) and 0.06 g/L of rhodium.

Example I-16

The promoter particles similar to Example I-1 were impregnated with a nickel nitrate solution, followed by drying and baking, so as to prepare a cerium-zirconium composite oxide supporting 26.7% of nickel oxide (NiO). Then, the nickel oxide-supporting cerium-zirconium composite oxide was dispersed in water and milled by a bead mill to have an average particle diameter of 150 nm, thereby preparing cerium-zirconium composite oxide particles Cc.

Next, boehmite similar to Example I-1 was used as barrier particles. 118.5 g of boehmite was put into a beaker and dispersed in water, and adjusted to be pH 4 by nitric acid. 135 g of the cerium-zirconium composite oxide particles Cc (as a solid content) was added to the boehmite slurry, followed by dispersing the mixture by stirring at high speed. Then, the slurry was dried and baked to prepare powder cc-1 in which the cerium-zirconium composite oxide particles Cc were isolated by alumina.

Next, 159.1 g of the powder cc-1, 15.9 g of boehmite alumina, 307.5 g of water and 17.5 g of a 10% nitric acid solution were put into a ball mill. The powder cc-1 was milled so as to prepare slurry cc-1 having an average particle diameter of 3 μm.

Then, the slurry cc-1 was applied to the monolithic substrate similar to Example I-1, followed by drying and baking, so as to form 275 g/L of a transition metal oxide layer. In addition, the slurry x-1 obtained in Example I-14 was applied on the transition metal oxide layer, followed by drying and baking, so as to form 55 g/L of a noble metal layer. A sample of Example I-16 thus obtained is a catalyst supporting 40 g/L of nickel oxide (NiO) and 0.06 g/L of rhodium.

Example I-17

The promoter particles similar to Example I-1 were impregnated with a cobalt nitrate solution, followed by drying and baking, so as to prepare a cerium-zirconium composite oxide supporting 26.7% of cobalt oxide ($CO_2O_3$). Then, the cobalt oxide-supporting cerium-zirconium composite oxide was dispersed in water and milled by a bead mill to have an average particle diameter of 150 nm, thereby preparing cerium-zirconium composite oxide particles Dd.

Next, boehmite similar to Example I-1 was used as barrier particles. 118.5 g of boehmite was put into a beaker and dispersed in water, and adjusted to be pH 4 by nitric acid. 135 g of the cerium-zirconium composite oxide particles Dd (as a solid content) was added to the boehmite slurry, followed by dispersing the mixture by stirring at high speed. Then, the slurry was dried and baked to prepare powder dd-1 in which the cerium-zirconium composite oxide particles Dd were isolated by alumina.

Next, 159.1 g of the powder dd-1, 15.9 g of boehmite alumina, 307.5 g of water and 17.5 g of a 10% nitric acid solution were put into a ball mill. The powder dd-1 was milled so as to prepare slurry dd-1 having an average particle diameter of 3 μm.

Then, the slurry dd-1 was applied to the monolithic substrate similar to Example I-1, followed by drying and baking, so as to form 275 g/L of a transition metal oxide layer. In addition, the slurry x-1 obtained in Example I-14 was applied on the transition metal oxide layer, followed by drying and baking, so as to form 55 g/L of a noble metal layer. A sample of Example I-17 thus obtained is a catalyst supporting 40 g/L of cobalt oxide ($CO_2O_3$) and 0.06 g/L of rhodium.

Example I-18

The cerium-zirconium composite oxide particles similar to Example I-1 were used as anchor particles and impregnated with a dinitrodiamine platinum solution, so as to prepare particles Y supporting 0.429% of platinum. Next, boehmite similar to Example I-1 was used as barrier particles. 50.8 g of boehmite was put into a beaker and dispersed in water, and adjusted to be pH 4 by nitric acid. 90 g of the particles Y was added to the boehmite slurry, followed by dispersing the mixture by stirring at high speed. Then, the slurry was dried and baked to prepare powder y-1 in which the particles Y were isolated by alumina.

Next, 159.1 g of the powder y-1, 15.9 g of boehmite alumina, 307.5 g of water and 17.5 g of a 10% nitric acid solution were put into a ball mill. The powder y-1 was milled so as to prepare slurry y-1 having an average particle diameter of 3 μm.

Then, the slurry aa-1 obtained in Example I-14 was applied to the monolithic substrate similar to Example I-1, followed by drying and baking, so as to form 275 g/L of a transition metal oxide layer. In addition, the slurry y-1 was applied on the transition metal oxide layer, followed by drying and baking, so as to form 55 g/L of a noble metal layer. A sample of Example I-18 thus obtained is a catalyst supporting 40 g/L of iron oxide ($Fe_2O_3$) and 0.15 g/L of platinum.

Example I-19

The cerium-zirconium composite oxide particles similar to Example I-1 were used as anchor particles and impregnated with a dinitrodiamine palladium solution, so as to prepare particles Z supporting 0.857% of palladium. Next, boehmite similar to Example I-1 was used as barrier particles. 50.8 g of boehmite was put into a beaker and dispersed in water, and adjusted to be pH 4 by nitric acid. 90 g of the particles Z was added to the boehmite slurry, followed by dispersing the mixture by stirring at high speed. Then, the slurry was dried and baked to prepare powder z-1 in which the particles Z were isolated by alumina.

Next, 159.1 g of the powder z-1, 15.9 g of boehmite alumina, 307.5 g of water and 17.5 g of a 10% nitric acid solution were put into a ball mill. The powder z-1 was milled so as to prepare slurry z-1 having an average particle diameter of 3 μm.

Then, the slurry aa-1 obtained in Example I-14 was applied to the monolithic substrate similar to Example I-1, followed by drying and baking, so as to form 275 g/L of a transition metal oxide layer. In addition, the slurry z-1 was applied on the transition metal oxide layer, followed by drying and baking, so as to form 55 g/L of a noble metal layer. A sample of Example I-19 thus obtained is a catalyst supporting 40 g/L of iron oxide ($Fe_2O_3$) and 0.3 g/L of palladium.

Example I-20

The promoter particles similar to Example I-1 was dispersed in water, followed by milling by a bead mill to have an average particle diameter of 700 nm. Then, iron oxide powder ($\alpha Fe_2O_3$) was dispersed in water, followed by milling by a bead mill to have an average particle diameter of 700 nm. Then, 90 g of γ-alumina powder was dispersed in water and adjusted to be pH 4, followed by milling by a bead mill to have an average particle diameter of 700 nm. The slurry containing 72 g of the cerium-zirconium composite oxide as a solid content and the iron oxide slurry containing 18 g of a solid content were added to the alumina slurry, followed by dispersing the mixture by stirring at high speed. Then, the slurry was dried and baked to prepare powder T in which the cerium-zirconium composite oxide particles and the iron oxide particles were isolated by alumina.

Next, 159.1 g of the powder T, 15.9 g of boehmite alumina, 307.5 g of water and 17.5 g of a 10% nitric acid solution were put into a ball mill. The powder T was milled so as to prepare slurry t-1 having an average particle diameter of 3 μm.

Then, the slurry t-1 was applied to the monolithic substrate similar to Example I-1, followed by drying and baking. Thus, a sample of Example I-20 in which 440 g/L of a transition metal oxide layer was provided in the monolithic substrate was prepared. The obtained sample of Example I-20 is a catalyst supporting 40 g/L of iron oxide ($\alpha Fe_2O_3$).

Comparative Example I-1

First, γ-alumina powder was impregnated with an iron nitrate solution, followed by drying and baking, so as to prepare γ-alumina powder S supporting 10% of iron oxide ($Fe_2O_3$). Next, 159.1 g of the powder S, 15.9 g of boehmite alumina, 307.5 g of water and 17.5 g of a 10% nitric acid solution were put into a ball mill. The powder S was milled so as to prepare slurry s-1 having an average particle diameter of 3 μm.

Then, the slurry s-1 was applied to the monolithic substrate similar to Example I-1, followed by drying and baking. Thus, a sample of Comparative Example I-1 in which 440 g/L of a transition metal oxide layer was provided in the monolithic substrate was prepared. The obtained sample of Comparative Example I-1 is a catalyst supporting 40 g/L of iron oxide ($Fe_2O_3$). As a result of the analysis by use of the X-ray diffractometer, the iron oxide ($Fe_2O_3$) was $\alpha Fe_2O_3$.

Comparative Example I-2

First, γ-alumina powder was impregnated with a dinitrodiamine platinum solution, so as to prepare powder U supporting 0.116% of platinum. Next, 159.1 of the powder U, 15.9 g of boehmite alumina, 307.5 g of water and 17.5 g of a 10% nitric acid solution were put into a ball mill. The powder U was milled so as to prepare slurry u-1 having an average particle diameter of 3 μm.

Next, γ-alumina powder containing 3 wt % of zirconium was impregnated with a rhodium nitrate solution, so as to prepare powder V supporting 0.12% of rhodium. Next, 159.1 g of the powder V, 15.9 g of boehmite alumina, 307.5 g of water and 17.5 g of a 10% nitric acid solution were put into a ball mill. The powder V was milled so as to prepare slurry v-1 having an average particle diameter of 3 μm.

Then, the slurry u-1 was applied to the monolithic substrate similar to Example I-1, followed by drying and baking, so as to form 275 g/L of a platinum catalyst layer. In addition, the slurry v-1 was applied on the platinum catalyst layer, followed by drying and baking, so as to form 55 g/L of a rhodium catalyst layer. A sample of Comparative Example I-2 thus obtained is a catalyst supporting 0.29 g/L of platinum and 0.06 g/L of rhodium, totally supporting 0.35 g/L of noble metal.

[Performance Evaluation]

Figure 7:
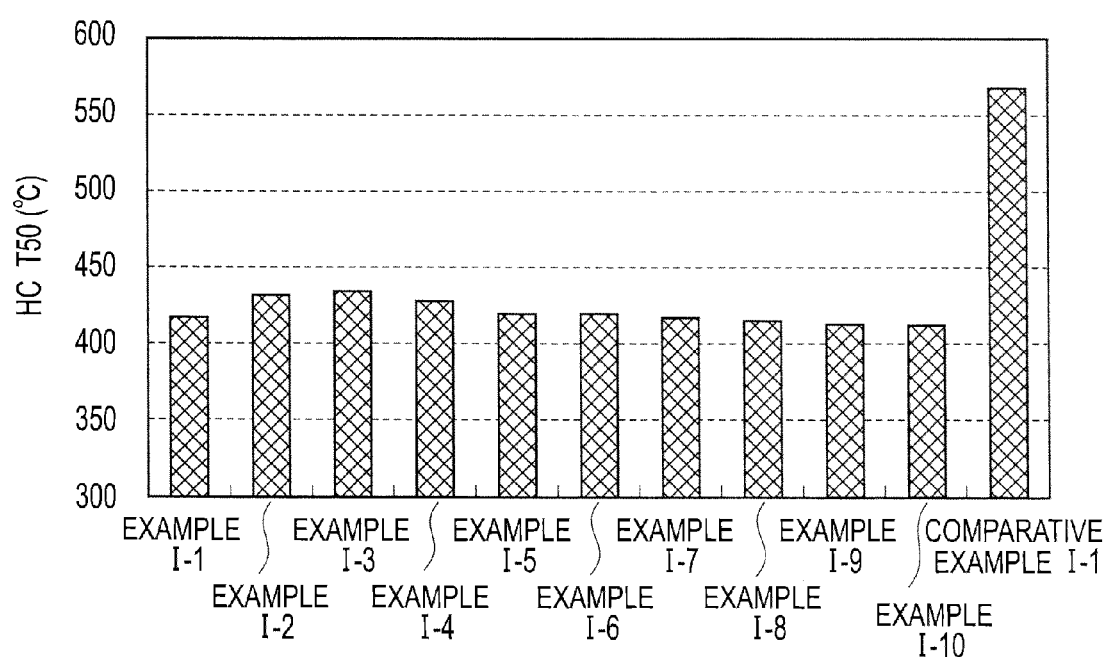
FIG. 7 is a graph showing a 50% purifying temperature (T50) of hydrocarbon (HC) in catalysts of Examples I-1 to I-10 and Comparative Example I-1.
Figure 8:
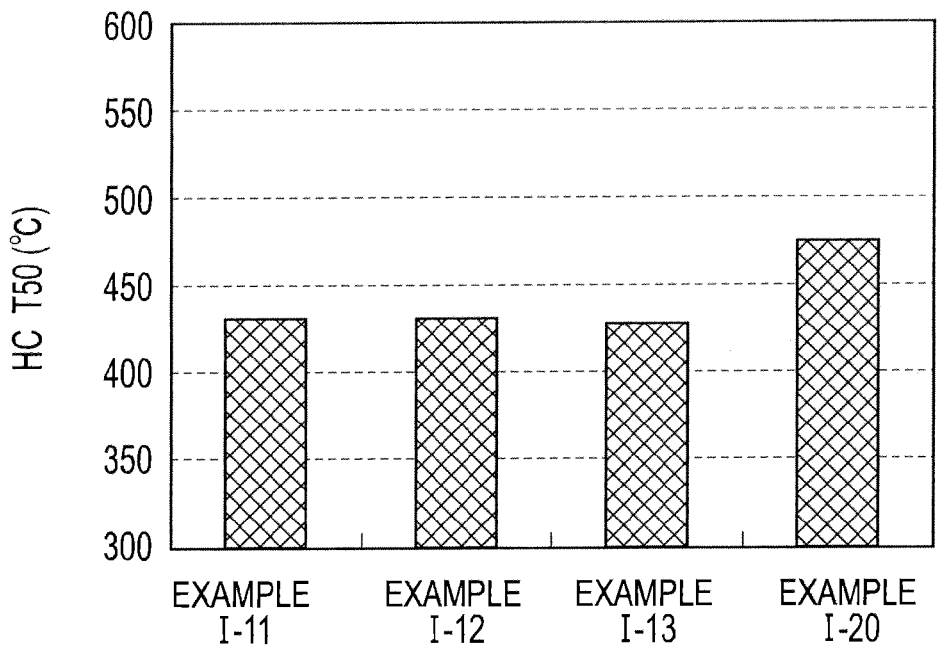
FIG. 8 is a graph showing a 50% purifying temperature of hydrocarbon in catalysts of Examples I-11 to I-13.
Figure 9:
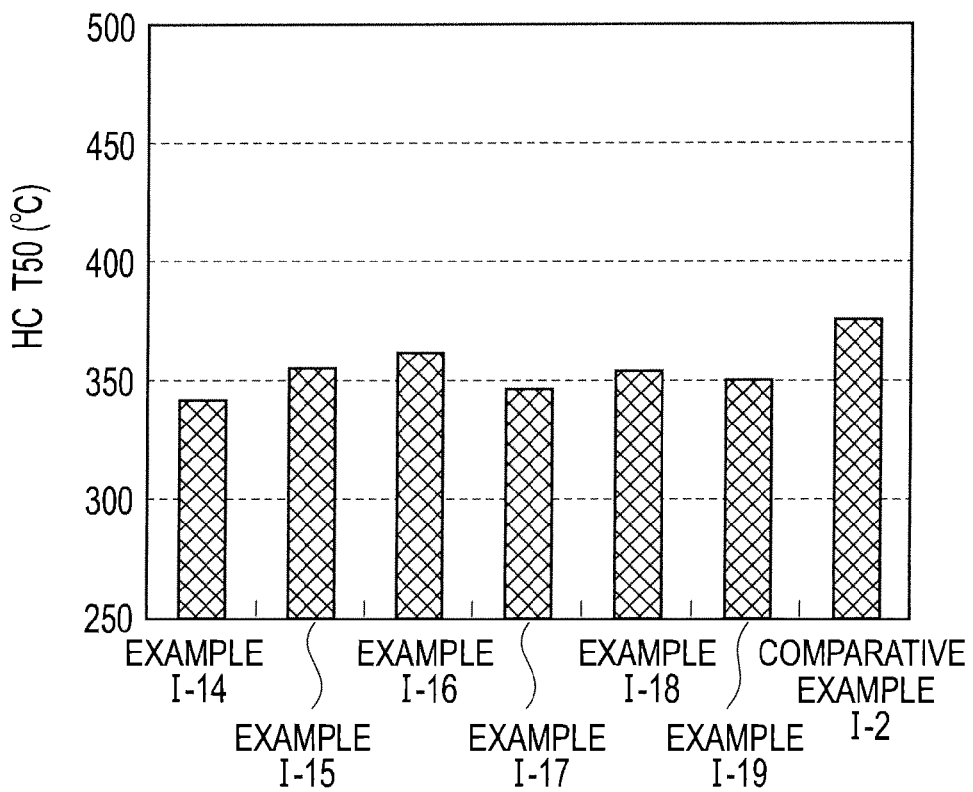
FIG. 9 is a graph showing a 50% purifying temperature of hydrocarbon in catalysts of Examples I-14 to I-19 and Comparative Example I-2.

The catalysts prepared in Examples I-1 to I-20 and Comparative Examples I-1 to I-2 were used. Five catalysts for each bank were mounted on an exhaust system of a V-type engine with a displacement of 3500 cc. Then, the catalysts were subjected to heat history under a condition of a catalyst inlet temperature of 700° C. while the engine was operated for 50 hours using Japanese regular gasoline. After the duration test, each catalyst was installed in a simulated exhaust gas flowing device, through which simulated exhaust gas containing a component shown in the following Table 1 flowed. Then, temperatures (T50) at which each conversion efficiency of HC, CO and NOx became 50% were observed, while increasing catalyst temperature by 30° C. per minute. Tables 2 to 4 show the evaluation results of the catalysts in Examples I-1 to I-20 and Comparative Examples I-1 to I-2. FIGS. 7 to 9 are bar charts indicating T50 of HC as the evaluation results of the catalyst in Examples I-1 to I-20 and Comparative Examples I-1 to I-2.

TABLE 1

| Reaction Gas Component | |
|---|---|
| NO | 1000 ppm |
| $O_2$ | 0.60% |
| $H_2$ | 0.20% |
| HC ($C_3H_6$) | 1665 ppm C |
| CO | 0.60% |
| $CO_2$ | 15.50% |
| $H_2O$ | 10% |
| $N_2$ | Residue |

Space Velocity: SV = 60000/h

TABLE 2

| | Transition Metal Oxide | | Promoter Particles | | Barrier Particles | | T50 (° C.) after Duration (50% purifying temperature) | | |
|---|---|---|---|---|---|---|---|---|---|
| | Compound Name | Particle Diameter (nm) | Compound Name | Particle Diameter (nm) | Compound Name | Particle Diameter (nm) | HC | CO | NOx |
| Example I-1 | $\alpha Fe_2O_3$ | 150 | CeZr Composite Oxide | 150 | Alumina | 60 | 415 | 408 | 425 |
| Example I-2 | $MnO_2$ | 150 | CeZr Composite Oxide | 150 | Alumina | 60 | 430 | 420 | 439 |
| Example I-3 | NiO | 150 | CeZr Composite Oxide | 150 | Alumina | 60 | 433 | 422 | 442 |
| Example I-4 | $Co_2O_3$ | 150 | CeZr Composite Oxide | 150 | Alumina | 60 | 427 | 418 | 435 |
| Example I-5 | $\alpha Fe_2O_3$ | 150 | CeZr Composite Oxide | 150 | Silica | 150 | 420 | 413 | 430 |
| Example I-6 | $\alpha Fe_2O_3$ | 150 | CeZr Composite Oxide | 150 | Alumina-Silica Mixture | 150 | 418 | 415 | 432 |
| Example I-7 | $\alpha Fe_2O_3$ | 150 | CeZr Composite Oxide | 150 | Alumina-Silica Compound | 150 | 417 | 410 | 427 |
| Example I-8 | $\gamma Fe_2O_3$ | 150 | CeZr Composite Oxide | 150 | Alumina | 60 | 416 | 409 | 426 |
| Example I-9 | $\alpha Fe_2O_3$ | 100 | Cerium Oxide | 100 | Alumina | 60 | 413 | 405 | 422 |
| Example I-10 | $\alpha Fe_2O_3$ | 150 | Praseodymium Oxide | 150 | Alumina | 60 | 412 | 403 | 420 |
| Comparative Example I-1 | $\alpha Fe_2O_3$ | — | — | — | — | — | 570 | 530 | 567 |

TABLE 3

| | Transition Metal Oxide | | Promoter Particles | | Barrier Particles | | T50 (° C.) after Duration (50% purifying temperature) | | |
|---|---|---|---|---|---|---|---|---|---|
| | Compound Name | Particle Diameter (nm) | Compound Name | Particle Diameter (nm) | Compound Name | Particle Diameter (nm) | HC | CO | NOx |
| Example I-11 | $\alpha Fe_2O_3$ | 500 | CeZr Composite Oxide | 150 | Alumina | 60 | 430 | 425 | 437 |
| Example I-12 | $\alpha Fe_2O_3$ | 150 | CeZr Composite Oxide | 500 | Alumina | 60 | 429 | 423 | 435 |
| Example I-13 | $\alpha Fe_2O_3$ | 150 | CeZr Composite Oxide | 150 | Alumina | 500 | 427 | 422 | 431 |
| Example I-20 | $\alpha Fe_2O_3$ | 700 | CeZr Composite Oxide | 700 | Alumina | 700 | 475 | 470 | 480 |

TABLE 4

| | Flow Path Side | | Substrate Side | | | | | | T50 (° C.) after Duration (50% purifying temperature) | | |
|---|---|---|---|---|---|---|---|---|---|---|---|
| | | | Transition Metal Oxide | | Promoter Particles | | Barrier Particles | | | | |
| | Noble Metal | Anchor Particles | Barrier Particles | Compound Name | Particle Diameter (nm) | Compound Name | Particle Diameter (nm) | Compound Name | Particle Diameter (nm) | HC | CO | NOx |
| Example I-14 | Rh | ZrLa Compound | Alumina | αFe$_2$O$_3$ | 150 | CeZr Composite Oxide | 150 | Alumina | 60 | 341 | 334 | 334 |
| Example I-15 | Rh | ZrLa Compound | Alumina | MnO$_2$ | 150 | CeZr Composite Oxide | 150 | Alumina | 60 | 354 | 350 | 356 |
| Example I-16 | Rh | ZrLa Compound | Alumina | NiO | 150 | CeZr Composite Oxide | 150 | Alumina | 60 | 361 | 357 | 361 |
| Example I-17 | Rh | ZrLa Compound | Alumina | Co$_2$O$_3$ | 150 | CeZr Composite Oxide | 150 | Alumina | 60 | 345 | 338 | 337 |
| Example I-18 | Pt | CeZr Composite Oxide | Alumina | αFe$_2$O$_3$ | 150 | CeZr Composite Oxide | 150 | Alumina | 60 | 353 | 351 | 353 |
| Example I-19 | Pd | CeZr Composite Oxide | Alumina | αFe$_2$O$_3$ | 150 | CeZr Composite Oxide | 150 | Alumina | 60 | 349 | 345 | 347 |
| Comparative Example I-2 | Rhodium Catalyst Layer | | | | | Platinum Catalyst Layer | | | | 375 | 367 | 368 |

In the catalysts in Examples I-1 to I-4, αFe$_2$O$_3$, MnO$_2$, NiO and Co$_2$O$_3$ were used as the transition metal oxide. In these catalysts, the cerium-zirconium composite oxide was used as the promoter particles, and alumina was used as the barrier particles to inhibit the movement of the particles.

In the catalysts in Examples I-5 to I-7, iron oxide (αFe$_2$O$_3$) was used as the transition metal oxide, and the cerium-zirconium composite oxide was used as the promoter particles. In addition, silica, the mixture of alumina and silica, and alumina-silica compound (mullite) were used as the barrier particles so as to isolate the iron oxide-supporting cerium-zirconium composite oxide particles.

In the catalyst in Example I-8, iron oxide (γFe$_2$O$_3$) was used as the transition metal oxide, the cerium-zirconium composite oxide was used as the promoter particles, and alumina was used as the barrier particles. In the catalyst in Example I-9, iron oxide was in contact with cerium oxide by a coprecipitation method. Although each particle diameter of iron oxide and cerium oxide is 100 nm that is smaller than the other examples, the other is the same as Example I-1. In the catalyst in Example I-10, praseodymium oxide was used instead of the cerium-zirconium composite oxide in Example I-1.

When comparing the catalysts between these examples, the catalysts of Examples I-1 to I-10 had better T50 than the catalyst of Comparative Example I-1, and could achieve better results due to the isolation of the particles, in which the transition metal oxide was in contact with the promoter particles, by using the barrier particles. When the iron oxide layer in Comparative Example I-1 was observed by a transmission electron microscope (TEM), an aggregation of iron oxide was confirmed. On the other hand, when the transition metal oxide layers of Examples I-1 to I-10 were observed by TEM, there was hardly any aggregation of the particles in which the transition metal oxide was in contact with the promoter particles.

In the catalysts in Examples I-5 to I-7, iron oxide (αFe$_2$O$_3$) was used as the transition metal oxide, and silica, the alumina-silica mixture and the alumina-silica compound (mullite) were used as the barrier particles so as to isolate the particles in which iron oxide was in contact with the promoter particles. According to the result of T50, it is considered that silica, the alumina-silica mixture and the alumina-silica compound have the effect to inhibit the aggregation of these particles.

Although the catalyst in Example I-8 employed γFe$_2$O$_3$, it is considered that the catalyst has the effect identical to the catalyst using αFe$_2$O$_3$. The catalyst in Example I-9 employed the particles in which iron oxide was in contact with cerium oxide by the coprecipitation method. The contacting particle diameter was 100 nm, which was smaller than that of other Examples. However, since the catalyst performance was superior to the other αFe$_2$O$_3$, it is considered that the effect derived from the particle diameter (dispersion effect) could be achieved.

In the catalyst in Example I-10, praseodymium oxide was used as the promoter particles. This example achieved the best catalyst performance among Examples I-1 to I-10. Thus, it is considered that the great promotion effect due to the oxygen release from Fe$_2$O$_3$ by praseodymium oxide can be achieved.

In the catalyst in Example I-11, iron oxide (αFe$_2$O$_3$) was used as the transition metal oxide, the cerium-zirconium composite oxide was used as the promoter particles, and alumina was used as the barrier particles. The average particle diameter of iron oxide was 500 nm. In the catalyst in Example I-12, iron oxide (αFe$_2$O$_3$) was used as the transition metal oxide, the cerium-zirconium composite oxide was used as the promoter particles, and alumina was used as the barrier particles, which were identical to Example I-11. However, the average particle diameter of the cerium-zirconium composite oxide was 500 nm. In the catalyst in Example I-13, iron oxide (αFe$_2$O$_3$) was used as the transition metal oxide, the cerium-zirconium composite oxide was used as the promoter particles, and alumina was used as the barrier particles, which were identical to the above examples. However, the average particle diameter of alumina was 500 nm. In the catalyst in Example I-20, iron oxide ($\alpha Fe_2O_3$) was used as the transition metal oxide, the cerium-zirconium composite oxide was used as the promoter particles, and alumina was used as the barrier particles, which were identical to the above examples. However, the average particle diameter of iron oxide was 700 nm, the average particle diameter of the cerium-zirconium composite oxide was 700 nm, and the average particle diameter of alumina was 700 nm.

When comparing Examples I-11 to I-13 with Example I-20, the catalyst performance was better in the former examples. When the oxide layers in these examples were observed by TEM, the prevention of the aggregation of the iron oxide particles and the cerium-zirconium composite oxide particles was ensured in Examples I-11 to I-13. In Example I-20, while the aggregation of the iron oxide particles and the cerium-zirconium composite oxide particles was prevented, the small aggregation was still observed. Accordingly, the average particle diameters of the transition metal oxide particles, the promoter particles and the barrier particles are preferably 500 nm or less. As the average particle diameters of the transition metal oxide particles, the promoter particles and the barrier particles are larger, a particle diameter difference between larger particles and smaller particles becomes larger. As a result, the smaller particles pass through the gaps between the larger particles, which may cause the aggregation of the particles.

The catalyst in Example I-14 employed iron oxide ($\alpha Fe_2O_3$) as the transition metal oxide, the cerium-zirconium composite oxide as the promoter particles, and alumina as the barrier particles, in which the rhodium catalyst layer was disposed on the transition metal oxide layer. The catalyst in Example I-15 employed manganese dioxide ($MnO_2$) as the transition metal oxide, the cerium-zirconium composite oxide as the promoter particles, and alumina as the barrier particles, in which the rhodium catalyst layer was disposed on the transition metal oxide layer. The catalyst in Example I-16 employed nickel oxide (NiO) as the transition metal oxide, the cerium-zirconium composite oxide as the promoter particles, and alumina as the barrier particles, in which the rhodium catalyst layer was disposed on the transition metal oxide layer. The catalyst in Example I-17 employed cobalt oxide ($CO_2O_3$) as the transition metal oxide, the cerium-zirconium composite oxide as the promoter particles, and alumina as the barrier particles, in which the rhodium catalyst layer was disposed on the transition metal oxide layer.

The catalyst in Example I-18 employed iron oxide ($\alpha Fe_2O_3$) as the transition metal oxide, the cerium-zirconium composite oxide as the promoter particles, and alumina as the barrier particles, in which the platinum catalyst layer was disposed on the transition metal oxide layer. The catalyst in Example I-19 employed iron oxide ($\alpha Fe_2O_3$) as the transition metal oxide, the cerium-zirconium composite oxide as the promoter particles, and alumina as the barrier particles, in which the palladium catalyst layer was disposed on the transition metal oxide layer.

The catalyst of Comparative Example I-2 was provided on the substrate with the γ-alumina layer supporting platinum, and the γ-alumina layer supporting rhodium and containing 3 wt % of zirconium. The catalyst of Comparative Example I-2 contained noble metal most, in which the amount of noble metal was 0.35 g/L. The catalysts in Examples I-14 to I-19 contained noble metal less than Comparative Example I-2. However, the catalysts in Examples I-14 to I-19 had better catalyst performance compared to Comparative Example I-2. Thus, it is considered that the transition metal oxide layer functions similarly to noble metal. With regard to noble metal, it is considered that rhodium has the best effect, and platinum and palladium have the next best effect.

It is presumed according to Examples I-1 to I-14 that the noble metal layer promotes earlier catalyst activity, and there is a mechanism of purification by the transition metal oxide layer after activation. When the platinum catalyst layer in Comparative Example I-2 after the duration test was observed by TEM, the aggregation of the platinum particles was found (approximately 20 nm). On the other hand, no definite aggregation of noble metal was observed in the catalysts in Examples I-14 to I-19.

Second Embodiment

An exhaust gas purifying catalyst according to Second Embodiment and a method for manufacturing the same will be explained with reference to the drawings. The elements identical to First Embodiment are indicated by the same reference numerals, and explanations thereof are not repeated.

(Exhaust Gas Purifying Catalyst)

The exhaust gas purifying catalyst according to the present embodiment includes the transition metal oxide layer and the noble metal layer similar to First Embodiment. The catalyst of the present embodiment includes a characteristic layer arrangement in which the transition metal oxide layer is located so as to come in contact with exhaust gas prior to the noble metal layer. Due to such an arrangement, excellent catalyst activity can be achieved in a low temperature range. The reason, which is not definitely defined in the present circumstances, may be because the transition metal oxide layer coming in contact with exhaust gas prior to the noble metal layer produces reaction active species reacting in the noble metal layer, or temperature of the transition metal oxide layer is preferentially elevated.

Figure 10:
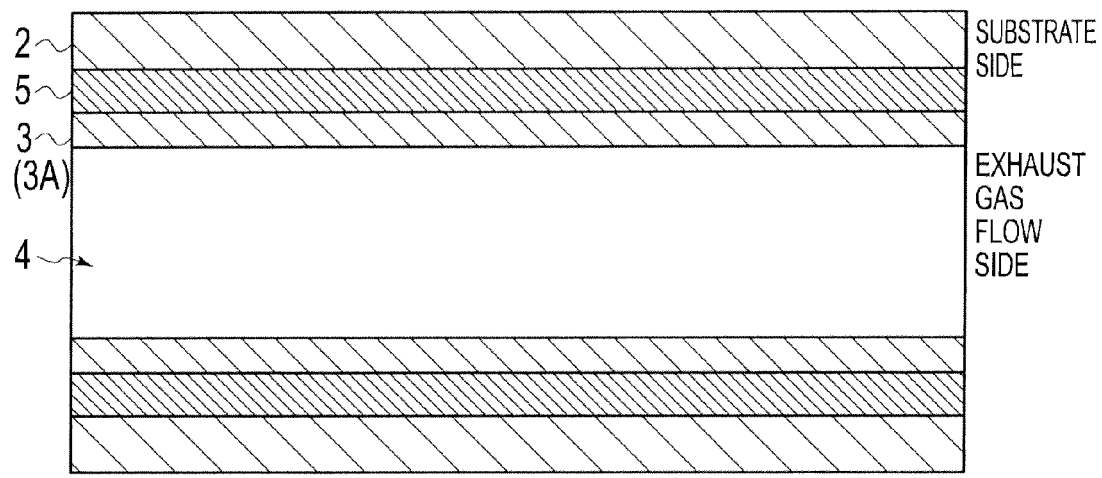
FIG. 10 is an enlarged cross-sectional view showing an example of a constitution of a catalyst layer in an exhaust gas purifying catalyst according to Second Embodiment.

Specific examples of the catalyst according to the present embodiment include the following ones. The first example of the catalyst includes a monolithic substrate on which the noble metal layer and the transition metal oxide layer are superposed in this order. Namely, the catalyst in which the transition metal oxide layer 3 is provided on the noble metal layer 5 can be exemplified, as shown in FIG. 10. The transition metal oxide layer 3 is preferably provided as an uppermost layer in order to come into first contact with exhaust gas. Namely, the transition metal oxide layer 3 can accelerate initiation of reaction with exhaust gas by bringing the transition metal oxide into first contact with exhaust gas. Additionally, another layer that has a certain function to purify exhaust gas may be provided between the transition metal oxide layer 3 and the noble metal layer 5.

Figure 11:
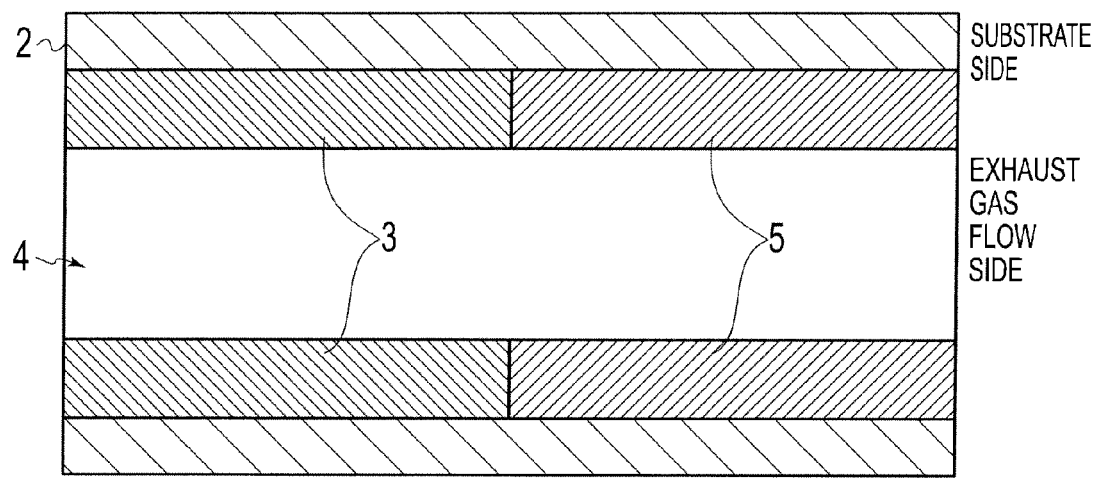
FIG. 11 is an enlarged cross-sectional view showing another example of the constitution of the catalyst layer in the exhaust gas purifying catalyst according to Second Embodiment.

The second example of the catalyst includes the monolithic substrate 2 on which the transition metal oxide layer 3 and the noble metal layer 5 are provided and aligned in this order from the front side with respect to the exhaust gas flow path. Namely, as shown in FIG. 11, the catalyst, in which the transition metal oxide layer 3 is located upstream of the exhaust gas flow path 4 in the monolithic substrate 2 and the noble metal layer 5 is located downstream of the transition metal oxide layer 3, can be exemplified.

However, the specific examples of the exhaust gas purifying catalyst according to the present embodiment are not limited to those. For example, as for the monolithic substrate, a honeycomb substrate provided with a plurality of cells having open ends and closed ends alternately on each end side, which is a so-called checkered honeycomb substrate, and a diesel particulate filter (PDF) may be used. It is to be noted that when the exhaust gas purifying catalyst is provided inside the cells that have the open ends on the downstream side of the exhaust gas flow direction in the above-mentioned honeycomb substrate, exhaust gas comes out of the inner wall side of the substrate. Thus, the catalyst in this case has the opposite layer arrangement to the first example of the exhaust gas purifying catalyst.

(Method for Manufacturing Exhaust Gas Purifying Catalyst)

The following is a description of a method for manufacturing the exhaust gas purifying catalyst according to the present embodiment. The catalyst according to the present embodiment can employ the transition metal oxide slurry containing the transition metal oxide powder and the noble metal slurry containing the noble metal powder described in First Embodiment. In the method for manufacturing the exhaust gas purifying catalyst of the above-mentioned first example, the noble metal slurry is applied on the monolithic substrate 2 and dried, and then the transition metal oxide slurry is applied thereto, followed by drying. In the method for manufacturing the exhaust gas purifying catalyst of the above-mentioned second example, the front side of the monolithic substrate is impregnated with the transition metal oxide slurry and dried, and then the rear side of the monolithic substrate is impregnated with the noble metal slurry and dried.

The following is a further detail of the present embodiment referring to examples and comparative examples. However, the present invention is not limited to those examples.

Example II-1

First, lanthanum-zirconium oxide particles were prepared as anchor particles. Then, the particles were impregnated with a rhodium nitrate solution, dried, and baked at 400° C. for one hour under air flow, so as to prepare rhodium-supporting lanthanum-zirconium oxide supporting a predetermined amount of rhodium particles. By milling this oxide, noble metal powder composed of rhodium-supporting lanthanum-zirconium oxide particles was prepared. Then, the noble metal powder, boehmite alumina, a 10% nitric acid solution, and ion-exchange water were put into a magnetic pot to be shaken and milled with alumina balls, thereby obtaining noble metal slurry.

Next, cerium-zirconium oxide particles were prepared as promoter particles. Then, the particles were impregnated with an iron nitrate solution, dried, and baked at 400° C. for one hour under air flow, so as to prepare iron oxide-supporting cerium-zirconium oxide supporting a predetermined amount of iron oxide particles. By milling this oxide, iron oxide-supporting cerium-zirconium oxide particles were prepared.

Next, the iron oxide-supporting cerium-zirconium oxide particles, boehmite alumina, nitric acid, and ion-exchange water were mixed so as to obtain slurry. The slurry was dried, baked at 550° C. for three hours under air flow and milled, so as to prepare transition metal oxide powder in which the iron oxide-supporting cerium-zirconium oxide particles were isolated by alumina. Then, the transition metal oxide powder, boehmite alumina, a 10% nitric acid solution, and ion-exchange water were put into a magnetic pot to be shaken and milled with alumina balls, thereby obtaining transition metal oxide slurry.

The obtained noble metal slurry was applied to a ceramic monolithic substrate (400 cells/6 mils, 0.12 L), followed by drying at 120° C. and baking at 400° C. under air flow. Thus, 55 g of a noble metal layer per 1 L of the monolithic substrate was formed. Then, the obtained transition metal oxide slurry was applied to the noble metal layer, followed by drying at 120° C. and baking at 400° C. under air flow. Thus, 275 g of a transition metal oxide layer per 1 L of the monolithic substrate was formed. A sample of Example II-1 thus obtained is a catalyst supporting 40 g of iron oxide ($Fe_2O_3$) and 0.3 g of rhodium (Rh) per 1 L of the monolithic substrate.

Example II-2

The transition metal oxide powder obtained in Example II-1 was used to prepare the transition metal oxide slurry similar to Example II-1. In order to apply the slurry easily to the monolithic substrate, the concentration of the slurry was adjusted by ion-exchange water. Then, the transition metal oxide slurry was applied to the monolithic substrate used in Example II-1, followed by drying at 120° C. and baking at 400° C. under air flow. Thus, a first catalyst only provided with the transition metal oxide layer on the monolithic substrate was obtained.

Next, the noble metal powder obtained in Example II-1 was used to prepare the noble metal slurry similar to Example II-1. In order to apply the slurry easily to the monolithic substrate, the concentration of the slurry was also adjusted by ion-exchange water. Then, the noble metal slurry was applied to the monolithic substrate used in Example II-1, followed by drying at 120° C. and baking at 400° C. under air flow. Thus, a second catalyst only provided with the noble metal layer on the monolithic substrate was obtained.

Next, the obtained first and second catalysts were cut in half so that each catalyst was to be 0.06 L. Then, the first catalyst only provided with the transition metal oxide layer was provided upstream of the substrate, and the second catalyst only provided with the noble metal layer was provided downstream of the transition metal oxide layer, thereby obtaining the catalyst of which total content was 0.12 L. A sample of Example II-2 thus obtained was provided with 330 g/L of the transition metal oxide layer and the noble metal layer, respectively, per 1 L of the monolithic substrate. In this sample, 40 g of iron oxide ($Fe_2O_3$) and 0.3 g of rhodium (Rh) were supported per 1 L of the monolithic substrate.

Comparative Example II-1

The noble metal powder obtained in Example II-1 was used to prepare the noble metal slurry similar to Example II-1. In order to apply the slurry easily to the monolithic substrate, the concentration of the slurry was also adjusted by ion-exchange water. Then, the noble metal slurry was applied to the monolithic substrate used in Example II-1, followed by drying at 120° C. and baking at 400° C. under air flow. In a sample of Comparative Example II-1 thus obtained, 330 g of the noble metal layer was provided and 0.3 g/L of rhodium (Rh) was supported per 1 L of the monolithic substrate.

Reference Example II-1

The transition metal oxide powder obtained in Example II-1 was used to prepare the transition metal oxide slurry similar to Example II-1. In order to apply the slurry easily to the monolithic substrate, the concentration of the slurry was adjusted by ion-exchange water. Then, the transition metal oxide slurry was applied to the monolithic substrate used in Example II-1, followed by drying at 120° C. and baking at 400° C. under air flow. In a sample of Reference Example II-1 thus obtained, 330 g/L of the transition metal oxide layer was provided and 40 g of iron oxide ($Fe_2O_3$) was supported per 1 L of the monolithic substrate.

[Performance Evaluation]

Each catalyst of Example II-1 to II-2, Comparative Example II-1 and Reference Example II-1 was installed in a simulated exhaust gas flowing device, through which simulated exhaust gas containing the component shown in Table 1 in First Embodiment flowed. While increasing catalyst temperature by 30° C. per minute, each conversion rate (purification rate) of hydrocarbon (HC), carbon monoxide (CO) and nitrogen oxide (NOx) was observed.

Figure 12:
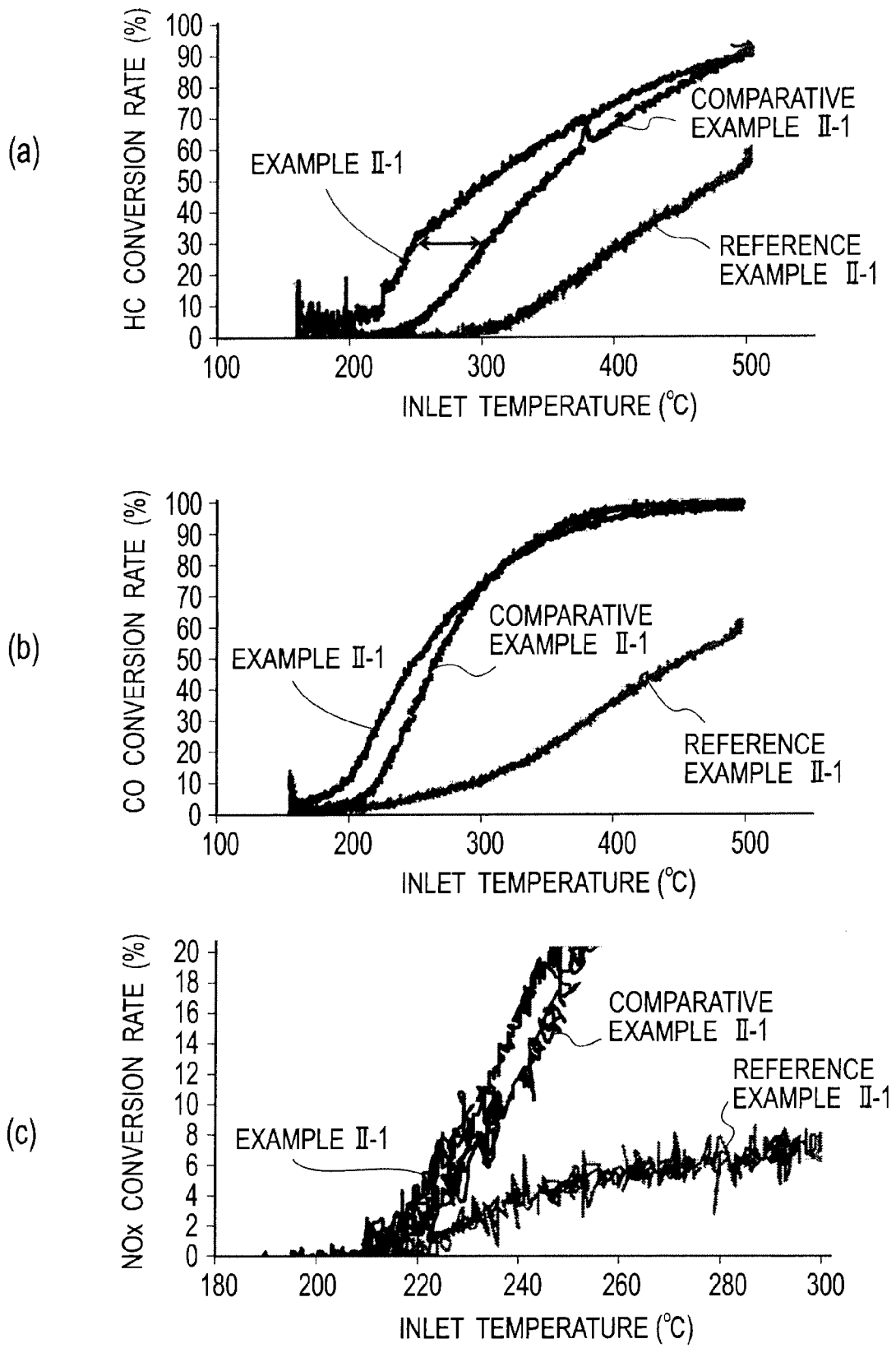
FIG. 12 is a graph showing a relationship between each conversion rate of HC, CO and NOx and a catalyst inlet temperature in Example II-1, Comparative Example II-1 and Reference Example II-1.

FIG. 12 shows a relationship between each conversion rate of HC, CO and NOx and each catalyst inlet temperature in Example II-1, Comparative Example II-1 and Reference Example II-1. According to FIG. 12, the catalyst of Example II-1 has excellent catalyst activity in a low temperature range compared to the catalysts in Comparative Example II-1 and Reference Example II-1. In the catalyst in Example II-1, an activation temperature in HC conversion is reduced approximately by 50° C., an activation temperature in CO conversion is reduced approximately by 20° C., and an activation temperature in NOx conversion is reduced approximately by 5° C., with respect to the catalyst in Comparative Example II-1.

Figure 13:
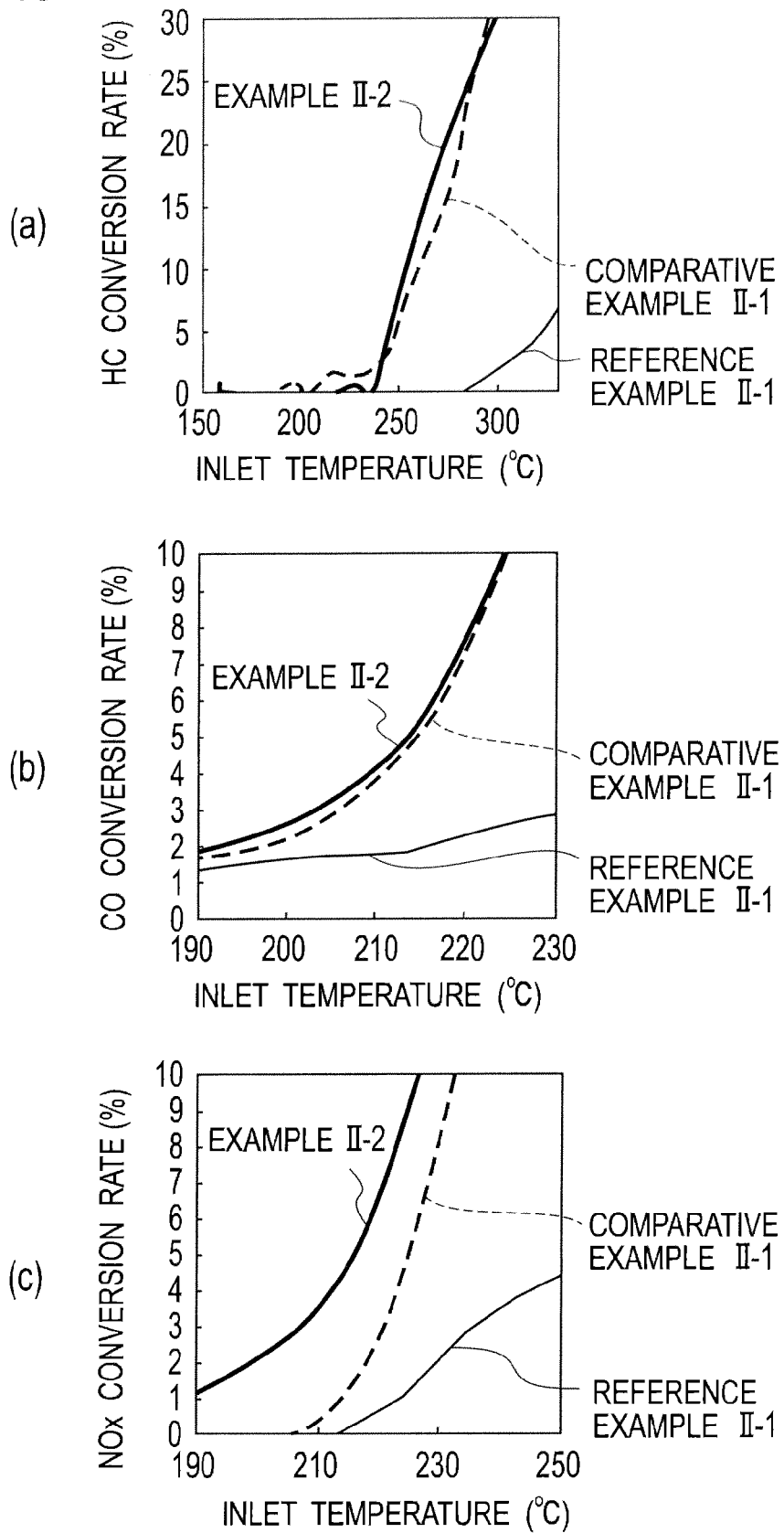
FIG. 13 is a graph showing a relationship between each conversion rate of HC, CO and NOx and a catalyst inlet temperature in Example II-2, Comparative Example II-1 and Reference Example II-1.

FIG. 13 shows a relationship between each conversion rate of HC, CO and NOx and each catalyst inlet temperature in Example II-2, Comparative Example II-1 and Reference Example II-1. According to FIG. 13, the catalyst of Example II-2 has excellent catalyst activity in a low temperature range compared to the catalysts in Comparative Example II-1 and Reference Example II-1. This clearly shows that the initiation of the reaction with exhaust gas is accelerated by bringing exhaust gas into first contact with the transition metal oxide layer, and into contact with the noble metal layer later.

Third Embodiment

An exhaust gas purifying catalyst according to Third Embodiment and a method for manufacturing the same will be explained with reference to the drawings. The elements identical to First Embodiment and Second Embodiment are indicated by the same reference numerals, and explanations thereof are not repeated.

(Exhaust Gas Purifying Catalyst)

Figure 14:
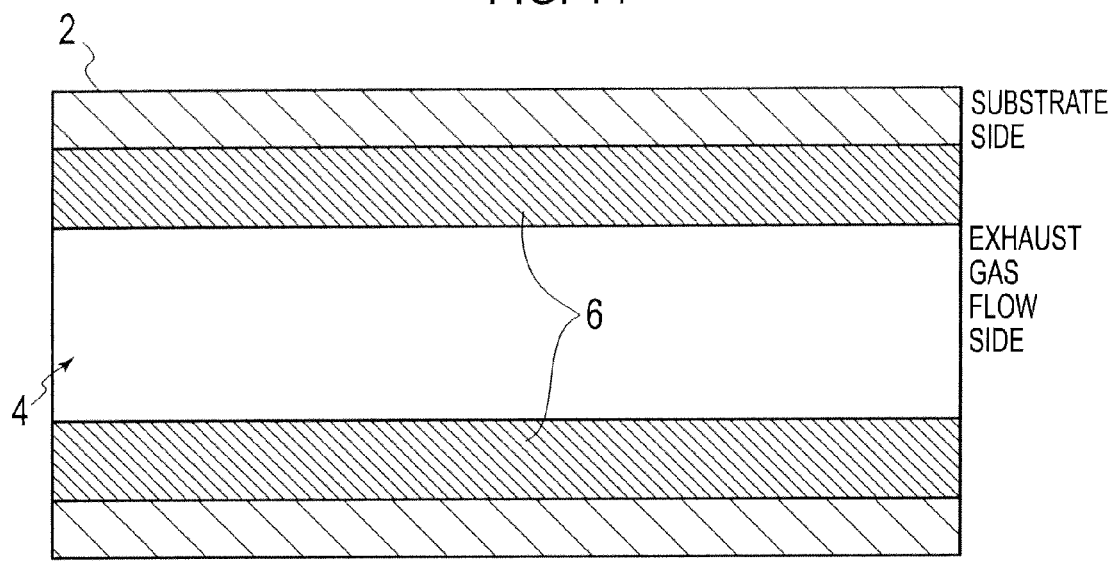
FIG. 14 is an enlarged cross-sectional view showing an example of a constitution of a catalyst layer in an exhaust gas purifying catalyst according to Third Embodiment.

The exhaust gas purifying catalyst according to the present embodiment includes the monolithic substrate 2, and at least one catalyst layer 6 formed on the monolithic substrate 2, as shown in FIG. 14. This catalyst layer 6 is a single mixed layer in which the transition metal oxide layer and the noble metal layer in First Embodiment are integrated. Namely, the catalyst layer 6 in the present embodiment is a layer in which the noble metal powder and the transition metal oxide powder in First Embodiment are mixed uniformly. Therefore, the exhaust gas purifying catalyst according to the present embodiment can provide excellent NOx purification performance in a high temperature range. Although the reason why such an effect can be achieved is not definitely defined in the present circumstances, it is considered that the NOx purification performance may be improved because of the following reasons.

(1) Enhancement of $NO_2$ Production

With regard to a mechanism of NOx purification, after NOx is oxidized to $NO_2$, the purification to be $N_2$ is enhanced due to a reduction reaction of $NO_2$. By providing the transition metal oxide layer and the noble metal layer in the same layer (adjacent to each other), the oxidation reaction from NOx to $NO_2$ is accelerated on the transition metal oxide. Since the oxidation reaction from NOx to $NO_2$ is a reversible reaction, the reduction reaction of $NO_2$ is accelerated in the noble metal particles as an active site before reaction progression from $NO_2$ to NOx. As a result, the conversion efficiency of NOx is improved.

(2) Enhancement of NOx Reduction by Hydrogen Production.

A water-gas-shift reaction ($CO+H_2O \rightarrow CO_2+H_2$) on the transition metal oxide is accelerated, and hydrogen ($H_2$) is generated to react with NOx species. Thus, the conversion efficiency of NOx is improved.

(3) Increase of Oxygen Storage Capacity (OSC)

By providing the barrier particles around the transition metal oxide, the aggregation of the transition metal oxide is prevented. As a result, oxygen storage capacity of the transition metal oxide can be achieved even after being subjected to a load, and atmospheric variation adjacent to the active site can be reduced. Accordingly, the conversion efficiency of NOx is improved.

In the present embodiment, an additional catalyst layer is preferably provided on the catalyst layer 6 in view of the improvement of the NOx purification performance. As an additional catalyst layer, the noble metal layer 5 shown in FIG. 5 is a preferable example.

(Method for Manufacturing Exhaust Gas Purifying Catalyst)

The following is a description of a method for manufacturing the exhaust gas purifying catalyst according to the present embodiment. The catalyst according to the present embodiment can employ the transition metal oxide powder and the noble metal powder described in First Embodiment. In other words, a catalyst layer is formed on the monolithic substrate by using the slurry containing the transition metal oxide powder and the noble metal powder. Specifically, the transition metal oxide powder and the noble metal powder described in First Embodiment are mixed with a solvent and a binder so as to prepare the slurry for the catalyst layer. Then, the slurry for the catalyst layer is applied on the monolithic substrate, followed by drying and baking. As for the formation of the additional catalyst layer described above, the noble metal slurry is applied on the catalyst layer 6, dried and baked, similarly to the preparation method in First Embodiment.

The following is a further detail of the present embodiment referring to examples and comparative examples. However, the present invention is not limited to those examples.

Example III-1

First, cerium-zirconium oxide (CZ) particles were prepared as promoter particles. Then, the particles were impregnated with an iron nitrate solution, dried and baked at 400° C. for one hour under air flow, so as to prepare iron oxide-supporting cerium-zirconium oxide supporting a predetermined amount of iron oxide particles. By milling this oxide, iron oxide-supporting cerium-zirconium oxide particles were prepared. Then, boehmite alumina, nitric acid and ion-exchange water were mixed to obtain slurry, and the iron oxide-supporting cerium-zirconium oxide particles were put into the obtained slurry, followed by stirring. The mixture thus obtained was dried, baked at 550° C. for three hours under air flow, followed by stirring, thereby preparing transition metal oxide powder in which the iron oxide-supporting cerium-zirconium oxide particles were isolated by alumina.

Next, lanthanum-zirconium oxide (ZL) particles were prepared as anchor particles. Then, the particles were impregnated with a rhodium nitrate solution, dried and baked at 400° C. for one hour under air flow, so as to prepare rhodium-supporting lanthanum-zirconium oxide supporting a predetermined amount of rhodium particles. By milling this oxide, noble metal powder composed of rhodium-supporting lanthanum-zirconium oxide particles was prepared.

Next, the noble metal powder, the transition metal oxide powder, boehmite alumina, a 10% nitric acid solution, and ion-exchange water were put into a magnetic pot to be shaken and milled with alumina balls, thereby obtaining slurry for a catalyst layer. The obtained slurry for the catalyst layer was applied to a ceramic monolithic substrate (400 cells/6 mils, 0.12 L), followed by drying at 120° C. and baking at 400° C. under air flow. Thus, 330 g of the catalyst layer per 1 L of the monolithic substrate was firmed. In a sample of Example III-1 thus obtained, 40 g of iron oxide ($Fe_2O_3$) and 0.3 g of rhodium (Rh) were supported per 1 L of the monolithic substrate.

Example III-2

With regard to the preparation of the noble metal powder, similar operations to those of Example III-1 were repeated except that a dinitrodiamine platinum solution was used instead of rhodium nitrate, and cerium-zirconium oxide (CZ) was used instead of lanthanum-zirconium oxide (ZL), thereby obtaining a catalyst in this example. In a sample of Example III-2 thus obtained, 40 g of iron oxide ($Fe_2O_3$) and 1.4 g of platinum (Pt) were supported per 1 L of the monolithic substrate.

Example III-3

With regard to the preparation of the noble metal powder, similar operations to those of Example III-1 were repeated except that a dinitrodiamine palladium solution was used instead of rhodium nitrate, and cerium-lanthanum-zirconium oxide (ZLC) was used instead of lanthanum-zirconium oxide (ZL), thereby obtaining a catalyst in this example. In a sample of Example III-3 thus obtained, 40 g of iron oxide ($Fe_2O_3$) and 0.06 g of palladium (Pd) were supported per 1 L of the monolithic substrate.

Example III-4

The transition metal oxide powder and the noble metal powder obtained in Example III-1, boehmite alumina, a 10% nitric acid solution, and ion-exchange water were put into a magnetic pot to be shaken and milled with alumina balls, thereby obtaining slurry for a catalyst layer (inner layer). The obtained slurry for the inner layer was applied to the monolithic substrate used in Example III-1, followed by drying at 120° C. and baking at 400° C. under air flow. Thus, 305 g of the inner layer per 1 L of the monolithic substrate was formed.

Next, the noble metal powder obtained in Example III-1, boehmite alumina, a 10% nitric acid solution, and ion-exchange water were put into a magnetic pot to be shaken and milled with alumina balls, thereby obtaining slurry for a catalyst layer (outer layer). The obtained slurry for the outer layer was applied to the monolithic substrate provided with the inner layer, followed by drying at 120° C. and baking at 400° C. under air flow. Thus, 25 g of the outer layer per 1 L of the monolithic substrate was formed. In a sample of Example III-4 thus obtained, 40 g of iron oxide ($Fe_2O_3$) was supported per 1 L of the monolithic substrate, and 0.15 g/L of rhodium (Rh) was supported on each of the inner layer and the outer layer.

Reference Example III-1

The transition metal oxide powder obtained in Example III-1, boehmite alumina, a 10% nitric acid solution, and ion-exchange water were put into a magnetic pot to be shaken and milled with alumina balls, thereby obtaining slurry for a catalyst layer. The obtained slurry for the catalyst layer was applied to the monolithic substrate used in Example III-1, followed by drying at 120° C. and baking at 400° C. under air flow. Thus, 275 g of the catalyst layer (transition metal oxide layer) per 1 L of the monolithic substrate was formed. In a sample of Reference Example III-1 thus obtained, 40 g of iron oxide ($Fe_2O_3$) was supported per 1 L of the monolithic substrate.

Comparative Example III-1

The noble metal powder obtained in Example III-1, boehmite alumina, a 10% nitric acid solution, and ion-exchange water were put into a magnetic pot to be shaken and milled with alumina balls, thereby obtaining slurry for a catalyst layer. The obtained slurry for the catalyst layer was applied to the monolithic substrate used in Example III-1, followed by drying at 120° C. and baking at 400° C. under air flow. Then, 330 g of the catalyst layer was applied to the monolithic substrate per 1 L, so as to obtain an exhaust gas purifying catalyst of this example. In the exhaust gas purifying catalyst thus obtained, 0.3 g of rhodium (Rh) was supported per 1 L of the monolithic substrate.

Comparative Example III-2

The noble metal powder obtained in Example III-2, boehmite alumina, a 10% nitric acid solution, and ion-exchange water were put into a magnetic pot to be shaken and milled with alumina balls, thereby obtaining slurry for a catalyst layer. The obtained slurry for the catalyst layer was applied to the monolithic substrate used in Example III-1, followed by drying at 120° C. and baking at 400° C. under air flow. Thus, 330 g of the catalyst layer (noble metal layer) per 1 L of the monolithic substrate was formed. In a sample of Comparative Example III-2 thus obtained, 1.4 g of platinum (Pt) was supported per 1 L of the monolithic substrate.

Comparative Example III-3

The noble metal powder obtained in Example III-3, boehmite alumina, a 10% nitric acid solution, and ion-exchange water were put into a magnetic pot to be shaken and milled with alumina balls, thereby obtaining slurry for a catalyst layer. The obtained slurry for the catalyst layer was applied to the monolithic substrate used in Example III-1, followed by drying at 120° C. and baking at 400° C. under air flow. Thus, 330 g of the catalyst layer (noble metal layer) per 1 L of the monolithic substrate was formed. In a sample of Comparative Example III-3 thus obtained, 0.06 g of palladium (Pd) was supported per 1 L of the monolithic substrate. Table 5 shows a part of specification of each example.

[Performance Evaluation]

Each of the exhaust gas purifying catalysts of the respective examples was installed immediately below an exhaust manifold of an engine (type: KA24) manufactured by NISSAN MOTOR CO., LTD. Then, the engine was steadily driven while keeping a catalyst inlet temperature at 480° C. Then, each gas composition at an outlet of the exhaust manifold and an outlet of the catalyst during driving was measured by an analyzer, so as to calculate each NOx conversion rate. The NOx conversion rate can be calculated by dividing the NOx concentration at the catalyst outlet by the NOx concentration at the exhaust manifold outlet. The obtained results are also shown in Table 5.

TABLE 5

| | Inner Layer | | | | | | | Outer Layer | | | |
|---|---|---|---|---|---|---|---|---|---|---|---|
| | Transition Metal Oxide Powder | | | | Noble Metal Powder | | | Noble Metal Powder | | | NOx |
| | Transition Metal Species | Amount of Transition Metal (g/L) | Promoter Species | Barrier Species | Noble Metal Species | Amount of Noble Metal (g/L) | Promoter Species | Noble Metal Species | Amount of Noble Metal (g/L) | Promoter Species | Conversion Rate (%) |
| Example III-1 | Fe | 40 | CZ | Al | Rh | 0.3 | ZL | — | — | — | 89 |
| Example III-2 | Fe | 40 | CZ | Al | Pt | 1.4 | CZ | — | — | — | 87 |
| Example III-3 | Fe | 40 | CZ | Al | Pd | 0.06 | ZLC | — | — | — | 88 |
| Example III-4 | Fe | 40 | CZ | Al | Rh | 0.15 | ZL | Rh | 0.15 | ZL | 93 |
| Reference Example III-1 | Fe | 40 | CZ | Al | — | — | — | — | — | — | 67 |
| Comparative Example III-1 | — | — | — | — | Rh | 0.3 | ZL | — | — | — | 69 |
| Comparative Example III-2 | — | — | — | — | Pt | 1.4 | CZ | — | — | — | 85 |
| Comparative Example III-3 | — | — | — | — | Pd | 0.06 | ZLC | — | — | — | 81 |

As shown in Table 5, the catalysts of Examples III-1 to III-4 have superior NOx conversion rates to the catalysts of Reference Example III-1 and Comparative Examples III-1 to III-3. In addition, although the catalysts of Examples III-1 to III-3 include the same amount of noble metal as the catalysts of Comparative Examples III-1 to III-3, respectively, the catalysts of Examples III-1 to III-3 have superior NOx conversion rates to the catalysts of Comparative Examples III-1 to III-3. Accordingly, the amount of noble metal to be used can be reduced in the catalysts of Examples III-1 to III-3. Further, although the catalyst of Example III-1 includes the same amount of noble metal as the catalyst of Example III-4, the catalyst of Example III-4 has a much superior NOx conversion rate to the catalyst of Example III-1. Accordingly, the amount of noble metal to be used can be further reduced in the catalyst of Example III-4.

Fourth Embodiment

An exhaust gas purifying catalyst according to Fourth Embodiment and a method for manufacturing the same will be explained with reference to the drawings. The elements identical to First Embodiment to Third Embodiment are indicated by the same reference numerals, and explanations thereof are not repeated.

(Exhaust Gas Purifying Catalyst)

The exhaust gas purifying catalyst according to the present embodiment includes the substrate 2 on which at least two catalyst layers are formed. Specifically, as shown in FIG. 10 in Second Embodiment, the catalyst is provided on an inner surface of the substrate 2 with a transition metal oxide layer 3A containing a transition metal oxide and the noble metal layer 5. The noble metal layer 5 is formed on the monolithic substrate 2, and the transition metal oxide layer 3A is formed on the noble metal layer 5. Preferably, the transition metal oxide contained in the transition metal oxide layer 3A is an oxide that activates harmful gas in exhaust gas, namely hydrocarbon (HC), carbon monoxide (CO) and nitrogen oxide (NOx), emitted from an internal combustion engine, when the harmful gas passes through the transition metal oxide layer 3A. In addition, noble metal powder contained in the noble metal layer 5 preferably purifies the harmful gas activated by the transition metal oxide with high efficiency.

The transition metal oxide layer 3A according to the present embodiment differs from the transition metal oxide layer 3 in First and Second Embodiments in that the transition metal oxide layer 3A does not include the promoter particles 20. In other words, the transition metal oxide layer 3A is a layer composed of the transition metal oxide particle 10, or composed of the transition metal oxide particles 10 and the barrier particles 30. In the transition metal oxide layer 3 in First and Second Embodiments, by supporting the transition metal oxide particles 10 on the promoter particle 20, the promoter particles 20 inhibits the movement of the transition metal oxide particles 10, so as to prevent sintering of the transition metal oxide particles. However, the transition metal oxide particles 10 have an ability to activate the harmful gas even if the promoter particles are not contained in the layer. Therefore, the layer composed of the transition metal oxide particles is provided on the noble metal layer 5, so that the harmful gas is activated by the transition metal oxide. Accordingly, the noble metal layer 5 as a lower layer can oxidize and reduce the gas with high efficiency.

The transition metal oxide contained in the transition metal oxide layer 3A is preferably the oxide that can activate hydrocarbon, carbon monoxide and nitrogen oxide in exhaust gas when those gases pass through the transition metal oxide layer 3A, as described above. Specifically, the transition metal oxide preferably includes at least one element selected from the group consisting of iron (Fe), manganese (Mn), nickel (Ni) and cobalt (Co).

Even if the transition metal oxide layer 3A is composed of the transition metal oxide particles that are mutually coupled by a binder, the transition metal oxide layer 3A can activate the harmful gas. However, similar to noble metal, since the transition metal oxide is aggregated and enlarged because of heat, the function to activate the gas may be depressed. Moreover, when the transition metal oxide is aggregated, porosity of the transition metal oxide layer 3A is decreased, which may cause prevention of gas flow and dispersion. In view of this, in the present embodiment, the transition metal oxide particles are preferably covered and surrounded by the barrier particles as in the case of the noble metal powder. Specifically, as shown in FIG. 3, the transition metal oxide powder composed of the transition metal oxide particles 10a surrounded by the barrier particles 30 is preferably used.

More specifically, the transition metal oxide powder is constituted by the transition metal oxide particles 10a and the barrier particles 30 that inhibit the aggregation of the transition metal oxide particles 10a caused by the mutual contact of the transition metal oxide particles 10a. Each single body (primary particles) or aggregate (second particles) of the transition metal oxide particles is included within each section partitioned by the barrier particles 30. Similar to the noble metal powder, in the transition metal oxide powder, the transition metal oxide particles 10a are included within the sections partitioned by the barrier particles 30, so as to prevent the transition metal oxide particles 10a from crossing over the sections partitioned by the barrier particles 30, coming into direct contact with each other, and becoming enlarged. Therefore, a decrease in surface areas of the transition metal oxide particles 10a can be prevented even in a high temperature condition. Accordingly, the activation of the harmful gas can be enhanced.

In addition, in the exhaust gas purifying catalyst according to the present embodiment, the transition metal oxide layer 3A is preferably provided adjacent to the exhaust gas flow path and interposed between the noble metal layer 5 and the exhaust gas flow path. Specifically, as shown in FIG. 10, the transition metal oxide layer 3A is provided as an upper layer on the noble metal layer 5. According to such a structure, exhaust gas entering the cell 2a passes through the transition metal oxide layer 3A first. Therefore, after the exhaust gas is activated by the transition metal oxide layer 3A, the exhaust gas reaches the noble metal layer 5. Accordingly, the exhaust gas can be purified with higher efficiency.

The above description merely represents a relative positional relationship between the respective layers. Therefore, an additional layer including a function to purify the exhaust gas may be provided between the transition metal oxide layer 3A and the noble metal layer 5. However, the transition metal oxide layer 3A and the noble metal layer 5 are preferably provided adjacent to each other in the catalyst of the present embodiment. Thus, the exhaust gas comes into contact with the noble metal layer 5 immediately after being activated by the transition metal oxide layer 3A. Since the exhaust gas can come into contact with noble metal while maintaining the exhaust gas-activated state, the purification efficiency can be improved.

In view of the earlier activation of the exhaust gas, the transition metal oxide layer 3A preferably faces the exhaust gas flow path 4. Namely, the transition metal oxide layer 3A is preferably the uppermost layer in all of the layers. Due to such a structure, the exhaust gas entering the cell 2a passes through the transition metal oxide layer 3A to be activated, and then purified by the noble metal layer 5 provided as the lower layer of the transition metal oxide layer 3A. Thus, the purification efficiency can be enhanced.

Figure 15:
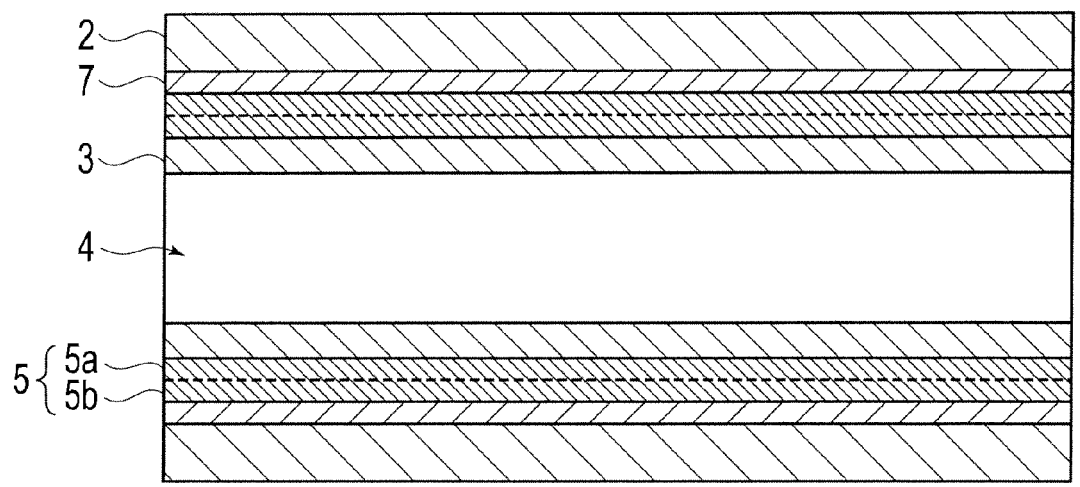
FIG. 15 is an enlarged cross-sectional view showing an example of a constitution of a catalyst layer in an exhaust gas purifying catalyst according to Fourth Embodiment.

According to the present embodiment, the catalyst can be provided with an undercoat layer 7 composed of heat-resistant inorganic oxide as a lowermost layer of the catalyst layer, as shown in FIG. 15. The undercoat layer 7 is mainly provided on the corners of the cell 2a. The undercoat layer 7 can prevent an active component in the catalyst layer from being applied locally and unevenly on the cell corners, prevent the amount of the active component to be applied to cover flat sections (cell walls) of each cell from decreasing, and prevent the catalyst layer from being detached from the substrate. Examples of the heat-resistant inorganic oxide to be used in the undercoat layer include alumina, silica and zeolite.

In addition, according to the present embodiment, the catalyst can be provided with the noble metal layer 5 composed of two layers, each of which may include different kinds of noble metal. Specifically, a catalyst layer 5a may include rhodium, and a catalyst layer 5b may include platinum. Alternatively, the catalyst layer 5a may include rhodium, and the catalyst layer 5b may include palladium. In the present embodiment, the catalyst preferably includes rhodium as the noble metal particles 40 in the noble metal layer 5. In other words, a layer containing rhodium as noble metal is preferably provided under the transition metal oxide layer. Even a small amount of rhodium can ensure high exhaust gas purification. According to the present embodiment, since the transition metal oxide layer as an upper layer activates exhaust gas, the purification efficiency can be enhanced by employing the noble metal layer containing rhodium together with the transition metal oxide layer.

(Method for Manufacturing Exhaust Gas Purifying Catalyst)

The following is a description of a method for manufacturing the exhaust gas purifying catalyst according to the present embodiment. First, a method for preparing the transition metal oxide powder will be explained. In this method, an aggregate in which transition metal oxide particles having an average primary particle diameter of 30 nm or less are aggregated to have a secondary particle diameter of approximately 2 μm is dispersed in a solvent. The aggregate is then milled so as to have the particle diameter of 500 nm or less, more specifically approximately 100 nm to 300 nm, for example, 150 nm, thereby preparing slurry containing the transition metal oxide in a fine particle state having a size of 500 nm or less, preferably 100 nm to 300 nm. In this method, the aggregate may be milled by use of a wet mill, specifically a bead mill. As for the solvent, water may be used.

Next, slurry in which a precursor of the barrier particles is dispersed in a solvent is prepared by the method described in First Embodiment. Then, the slurry containing the transition metal oxide in a fine particle state and the precursor slurry are mixed, followed by stirring at high speed, so as to surround the transition metal oxide particles by the precursor of the barrier particles. Then, the slurry including the transition metal oxide particles surrounded by the precursor is dried and baked, thereby obtaining the transition metal oxide powder.

The transition metal oxide powder thus obtained is mixed with a binder to be slurried, thereby preparing transition metal oxide slurry. Noble metal slurry may be prepared by the method described in First Embodiment. Then, one of the transition metal oxide slurry and the noble metal slurry is applied to an inner surface of a monolithic substrate, followed by drying. Then, the other slurry is applied to the substrate, followed by drying and baking, thereby obtaining the exhaust gas purifying catalyst according to the present embodiment.

As for the transition metal oxide layer 3A, when a layer in which the transition metal oxide particles are not isolated by the barrier particles, commercially available transition metal oxide particles are dispersed in a solvent such as water, and milled by a ball mill to have a size of a few micrometer, followed by adding a binder and stirring at high speed, thereby obtaining transition metal oxide slurry. The prepared transition metal oxide slurry is then applied to a substrate, dried and baked, thereby obtaining an exhaust gas purifying catalyst in which the transition metal oxide particles are not isolated by the barrier particles.

According to the method for preparing the transition metal oxide powder and the noble metal powder, the slurry prepared by milling the transition metal oxide, the anchor particles and the barrier particles by a bead mill is used. Alternatively, the slurry may be prepared by employing the transition metal oxide, the anchor particles and the harrier particles that are micronized to have a size of several tens of nanometer by a PVS method (Physical Vapor Synthesis method) or the like. In the PVS method, a raw material (metal) is converted to a metal atom vapor by heat energy. Then, by bringing the metal atom vapor in contact with reaction gas (oxygen), a molecule of metal oxide and a cluster are formed, followed by cooling immediately, thereby manufacturing a microfine particle material in which an increase of a particle diameter is suppressed.

In order to provide the noble metal layer and the transition metal oxide layer as a porous catalyst layer, the transition metal oxide slurry and the noble metal slurry may be mixed with carbon black powder. More specifically, the slurries are mixed with carbon black powder, followed by applying to the monolithic substrate and baking. Accordingly, the carbon black powder is oxidized by heat and removed to be gaps, thereby obtaining the porous catalyst layer.

The following is a further detail of the present embodiment referring to examples and comparative examples.

Catalyst Preparation

Example IV-1

First, 180 g of γ-alumina powder and 20 g of boehmite alumina were put in a ball mill. Then, 282.5 g of water and 17.5 g of a 10% nitric acid solution were further put in the ball mill, followed by milling, thereby preparing slurry c-1 having an average particle diameter of 3 μm.

Next, cerium-zirconium composite oxide particles ($CeO_2$:$ZrO_2$=78:22 (ratio by weight)) having an average particle diameter of 30 nm were used as anchor particles, and impregnated with a dinitrodiamine platinum solution, so as to prepare cerium-zirconium composite oxide particles A supporting 1.0 wt % of platinum (Pt). Then, 118.5 g of rectangular boehmite (20 nm×20 nm×60 nm) (containing 24% of moisture) was put into a beaker and dispersed in water, and adjusted to be pH 4 by nitric acid. 90 g of the cerium-zirconium composite oxide particles A was further put into the beaker, followed by dispersing by stirring at high speed. The slurry thus obtained was dried and baked, so as to prepare noble metal powder a-1 in which the cerium-zirconium composite oxide particles A were isolated by alumina. Then, 168 g of the noble metal powder a-1, 7 g of boehmite alumina, and 38.41 g of carbon black powder were put into a ball mill. 307.5 g of water and 17.5 g of a 10% nitric acid solution were further put into the ball mill, followed by milling the powder a-1, thereby preparing slurry a-1 having an average particle diameter of 3 μm.

Next, zirconium-lanthanum composite oxide particles ($ZrO_2$:$La_2O_3$=97:3 (ratio by weight)) having an average particle diameter of 20 nm were impregnated with a rhodium nitrate solution, so as to prepare particles B supporting 0.2 wt % of rhodium. Then, 50.8 g of the rectangular boehmite was put into a beaker and dispersed in water, and adjusted to be pH 4 by nitric acid. 90 g of the particles B was further put into the beaker, followed by dispersing by stirring at high speed. The slurry thus obtained was dried and baked, so as to prepare noble metal powder b-1 in which the particles B were isolated by alumina. Then, 168 g of the noble metal powder b-1, 7 g of boehmite alumina, and 38.41 g of carbon black powder were put into a ball mill. 307.5 g of water and 17.5 g of a 10% nitric acid solution were further put into the ball mill and milled, thereby preparing slurry b-1 having an average particle diameter of 3 μm.

Next, iron oxide ($\alpha Fe_2O_3$) was dispersed in water, followed by milling by a ball mill, so as to prepare slurry having an average particle diameter of 3 μm. The slurry (containing 90 g of $\alpha Fe_2O_3$) was mixed with boehmite alumina (containing 10 g of $Al_2O_3$) as a binder, and adjusted to be pH 4 by nitric acid, followed by dispersing by stirring at high speed, thereby preparing $\alpha Fe_2O_3$ slurry f-1.

Next, the slurry c-1 was applied to a monolithic substrate having a diameter φ of 36 mm, 600 cells and 4 mils (content: 0.04 L), followed by drying and baking, thereby forming 50 g/L of an undercoat layer (alumina layer) (first layer). Then, the slurry a-1 was applied to the substrate, followed by drying and baking, thereby forming 80 g/L of a noble metal layer (second layer). Then, the slurry b-1 was applied to the substrate, followed by drying and baking, thereby forming 80 g/L of a noble metal layer (third layer). Further, the $\alpha Fe_2O_3$ slurry f-1 was applied to the substrate, followed by drying and baking, thereby forming 27.8 g/L of an iron oxide layer (transition metal oxide layer) (fourth layer). Thus, an exhaust gas purifying catalyst of Example IV-1 was obtained. The catalyst of Example IV-1 thus obtained is a catalyst in which 0.4/L of Pt, 0.112 g/L of Rh and 25 g/L of $\alpha Fe_2O_3$ are supported.

Example IV-2

First, manganese oxide ($MnO_2$) was dispersed in water, followed by milling by a ball mill, so as to prepare slurry having an average particle diameter of 3 μm. The slurry (containing 90 g of $MnO_2$) was mixed with boehmite alumina (containing 10 g of $Al_2O_3$) as a binder, and adjusted to be pH 4 by nitric acid, followed by dispersing by stirring at high speed, thereby preparing $MnO_2$ slurry f-2. Then, similar operations to those of Example IV-1 were repeated except that the $MnO_2$ slurry f-2 was used instead of the $\alpha Fe_2O_3$ slurry f-1 of Example IV-1, thereby obtaining an exhaust gas purifying catalyst of Example IV-2. The catalyst of Example IV-2 thus obtained is a catalyst in which 0.4 g/L of Pt, 0.112 g/L of Rh and 25 g/L of $MnO_2$ are supported.

Example IV-3

First, nickel oxide (NiO) was dispersed in water, followed by milling by a ball mill, so as to prepare slurry having an average particle diameter of 3 μm. The slurry (containing 90 g of NiO) was mixed with boehmite alumina (containing 10 g of $Al_2O_3$) as a binder, and adjusted to be pH 4 by nitric acid, followed by dispersing by stirring at high speed, thereby preparing NiO slurry f-3. Then, similar operations to those of Example IV-1 were repeated except that the NiO slurry f-3 was used instead of the $\alpha Fe_2O_3$ slurry f-1 of Example IV-1, thereby obtaining an exhaust gas purifying catalyst of Example IV-3. The catalyst of Example IV-3 thus obtained is a catalyst in which 0.4 g/L of Pt, 0.112 g/L of Rh and 25 g/L of NiO are supported.

Example IV-4

First, cobalt oxide ($CO_2O_3$) was dispersed in water, followed by milling by a ball mill, so as to prepare slurry having an average particle diameter of 3 μm. The slurry (containing 90 g of $CO_2O_3$) was mixed with boehmite alumina (containing 10 g of $Al_2O_3$) as a binder, and adjusted to be pH 4 by nitric acid, followed by dispersing by stirring at high speed, thereby preparing $CO_2O_3$ slurry f-4. Then, similar operations to those of Example IV-1 were repeated except that the $CO_2O_3$ slurry f-4 was used instead of the $\alpha Fe_2O_3$ slurry f-1 of Example IV-1, thereby obtaining an exhaust gas purifying catalyst of Example IV-4. The catalyst of Example IV-4 thus obtained is a catalyst in which 0.4 g/L of Pt, 0.112 g/L of Rh and 25 g/L of $CO_2O_3$ are supported.

Example IV-5

First, iron oxide ($\alpha Fe_2O_3$) was dispersed in water, followed by milling by a bead mill, so as to prepare $\alpha Fe_2O_3$ slurry having an average particle diameter of 150 nm. Then, 118.4 g of rectangular boehmite (20 nm×20 nm×60 nm) (containing 24% of moisture) was put into a beaker and dispersed in water, and adjusted to be pH 4 by nitric acid. The $\alpha Fe_2O_3$ slurry (containing 90 g of $\alpha Fe_2O_3$) was added to the boehmite slurry, followed by dispersing by stirring at high speed. Then, the mixed slurry was dried and baked, so as to prepare powder d-1 in which $\alpha Fe_2O_3$ was isolated by alumina. Then, 168 g of the powder d-1 and 7 g of boehmite alumina were put into a ball mill. 307.5 g of water and 17.5 g of a 10% nitric acid solution were further put into the ball mill, followed by milling the powder d-1, thereby preparing slurry d-1 having an average particle diameter of 3 μm.

Next, the slurry c-1, the slurry a-1 and the slurry b-1 sere sequentially applied to the monolithic substrate similar to Example IV-1, thereby forming the first to third layers in the same manner as Example IV-1. Then, the slurry d-1 was applied to the substrate, followed by drying and baking, thereby forming 50 g/L of an iron oxide layer (transition metal oxide layer) (fourth layer). Thus, an exhaust gas purifying catalyst of Example IV-5 was obtained. The catalyst of Example IV-5 thus obtained is a catalyst in which 0.4 g/L of Pt, 0.112 g/L of Rh and 25 g/L of $\alpha Fe_2O_3$ are supported.

Example IV-6

First, iron oxide ($\alpha Fe_2O_3$) was dispersed in water, followed by milling by a bead mill, so as to prepare $\alpha Fe_2O_3$ slurry having an average particle diameter of 150 nm. Then, mesoporous silica having a BET specific surface area of 630 m$^2$/g was dispersed in water, followed by milling by a head mill, so as to prepare silica slurry having an average particle diameter of 150 nm. The silica slurry (containing 90 g of silica) was mixed with the $\alpha Fe_2O_3$ slurry (containing 90 g of $\alpha Fe_2O_3$), followed by dispersing by stirring at high speed. The slurry thus obtained was dried and baked, so as to prepare powder d-2 in which $\alpha Fe_2O_3$ was isolated by silica. Then, 168 g of the powder d-2 and 35 g of silica sol (containing 20 wt % of silica) were put into a ball mill. 307.5 g of water and 17.5 g of a 10% nitric acid solution were further put into the ball mill, followed by milling the powder d-2, thereby preparing slurry d-2 having an average particle diameter of 3 μm.

Then, similar operations to those of Example IV-5 were repeated except that the slurry d-2 was used instead of the slurry d-1 of Example IV-5, thereby obtaining an exhaust gas purifying catalyst of Example IV-6. The catalyst of Example IV-6 thus obtained is a catalyst in which 0.4 g/L of Pt, 0.112 g/L of Rh and 25 g/L of $\alpha Fe_2O_3$ are supported.

Example IV-7

First, iron oxide ($\alpha Fe_2O_3$) was dispersed in water, followed by milling by a bead mill, so as to prepare $\alpha Fe_2O_3$ slurry having an average particle diameter of 150 nm. Then, mesoporous silica having a BET specific surface area of 630 m$^2$/g was dispersed in water, followed by milling by a bead mill, so as to prepare silica slurry having an average particle diameter of 150 nm. Then, 118.4 g of rectangular boehmite (20 nm×20 nm×60 nm) (containing 24% of moisture) was put into a beaker and dispersed in water, and adjusted to be pH 4 by nitric acid. The silica slurry (containing 45 g of silica) was added to the adjusted boehmite, followed by stirring. Then, the mixed slurry of alumina and silica (containing 90 g of a solid content) was mixed with the $\alpha Fe_2O_3$ slurry (containing 90 g of $\alpha Fe_2O_3$), followed by dispersing by stirring at high speed. Then, the slurry thus obtained was dried and baked, so as to prepare powder d-3 in which $\alpha Fe_2O_3$ was isolated by the mixture of alumina and silica. Then, 168 g of the powder d-3 and 7 g of boehmite alumina were put into a ball mill. 307.5 g of water and 17.5 g of a 10% nitric acid solution were further put into the ball mill, followed by milling the powder d-3, thereby preparing slurry d-3 having an average particle diameter of 3 μm.

Then, similar operations to those of Example IV-5 were repeated except that the slurry d-3 was used instead of the slurry d-1 of Example IV-5, thereby obtaining an exhaust gas purifying catalyst of Example IV-7. The catalyst of Example IV-7 thus obtained is a catalyst in which 0.4 g/L of Pt, 0.112 g/L of Rh and 25 g/L of $\alpha Fe_2O_3$ are supported.

Example IV-8

First, iron oxide ($\alpha Fe_2O_3$) was dispersed in water, followed by milling by a bead mill, so as to prepare $\alpha Fe_2O_3$ slurry having an average particle diameter of 150 nm. Then, mullite ($3Al_2O_3 \cdot 2SiO_2$) was dispersed in water, followed by milling by a bead mill, so as to prepare mullite slurry having an average particle diameter of 150 nm. Then, the mullite slurry (containing 90 g of mullite) was mixed with the $\alpha Fe_2O_3$ slurry (containing 90 g of $\alpha Fe_2O_3$), followed by dispersing by stirring at high speed. Then, the slurry thus obtained was dried and baked, so as to prepare powder d-4 in which $\alpha Fe_2O_3$ was isolated by mullite. Then, 168 g of the powder d-4 and 7 g of boehmite alumina were put into a ball mill. 307.5 g of water and 17.5 g of a 10% nitric acid solution were further put into the ball mill, followed by milling the powder d-4, thereby preparing slurry d-4 having an average particle diameter of 3 μm.

Then, similar operations to those of Example IV-5 were repeated except that the slurry d-4 was used instead of the slurry d-1 of Example IV-5, thereby obtaining an exhaust gas purifying catalyst of Example IV-8. The catalyst of Example IV-8 thus obtained is a catalyst in which 0.4 g/L of Pt, 0.112 g/L of Rh and 25 g/L of $\alpha Fe_2O_3$ are supported.

Example IV-9

First, iron oxide ($\gamma Fe_2O_3$) was dispersed in water, followed by milling by a bead mill, so as to prepare $\gamma Fe_2O_3$ slurry having an average particle diameter of 150 nm. Then, 118.4 g of rectangular boehmite (20 nm×20 nm×60 nm) (containing 24% of moisture) was put into a beaker and dispersed in water, and adjusted to be pH 4 by nitric acid. The $\gamma Fe_2O_3$ slurry (containing 90 g of $\gamma Fe_2O_3$) was added to the boehmite slurry, followed by dispersing by stirring at high speed. Then, the slurry thus obtained was dried and baked, so as to prepare powder d-5 in which $\gamma Fe_2O_3$ was isolated by alumina. Then, 168 g of the powder d-5 and 7 g of boehmite alumina were put into a ball mill. 307.5 g of water and 17.5 g of a 10% nitric acid solution were further put into the ball mill, followed by milling the powder d-5, thereby preparing slurry d-5 having an average particle diameter of 3 μm.

Then, similar operations to those of Example IV-5 were repeated except that the slurry d-5 was used instead of the slurry d-1 of Example IV-5, thereby obtaining an exhaust gas purifying catalyst of Example IV-9. The catalyst of Example IV-9 thus obtained is a catalyst in which 0.4 g/L of Pt, 0.112 g/L of Rh and 25 g/L of $\gamma Fe_2O_3$ are supported.

Example IV-10

First, manganese oxide ($MnO_2$) was dispersed in water, followed by milling by a head mill, so as to prepare $MnO_2$ slurry having an average particle diameter of 150 nm. Then, 118.4 g of rectangular boehmite (20 nm×20 nm×60 nm) (containing 24% of moisture) was put into a beaker and dispersed in water, and adjusted to be pH 4 by nitric acid. The $MnO_2$ slurry (containing 90 g of $MnO_2$) was added to the boehmite slurry, followed by dispersing by stirring at high speed. Then, the slurry thus obtained was dried and baked, so as to prepare powder d-6 in which $MnO_2$ was isolated by alumina. Then, 168 g of the powder d-6 and 7 g of boehmite alumina were put into a ball mill. 307.5 g of water and 17.5 g of a 10% nitric acid solution were further put into the ball mill, followed by milling the powder d-6, thereby preparing slurry d-6 having an average particle diameter of 3 μm.

Then, similar operations to those of Example IV-5 were repeated except that the slurry d-6 was used instead of the slurry d-1 of Example IV-5, thereby obtaining an exhaust gas purifying catalyst of Example IV-10. The catalyst of Example IV-10 thus obtained is a catalyst in which 0.4 g/L of Pt, 0.112 g/L of Rh and 25 g/L of $MnO_2$ are supported.

Example IV-11

First, nickel oxide (NiO) was dispersed in water, followed by milling by a bead mill, so as to prepare NiO slurry having an average particle diameter of 150 nm. Then, 118.4 g of rectangular boehmite (20 nm×20 nm×60 nm) (containing 24% of moisture) was put into a beaker and dispersed in water, and adjusted to be pH 4 by nitric acid. The NiO slurry (containing 90 g of NiO) was added to the boehmite slurry, followed by dispersing by stirring at high speed. Then, the slurry thus obtained was dried and baked, so as to prepare powder d-7 in which. NiO was isolated by alumina. Then, 168 g of the powder d-7 and 7 g of boehmite alumina were put into a ball mill. 307.5 g of water and 17.5 g of a 10% nitric acid solution were further put into the ball mill, followed by milling the powder d-7, thereby preparing slurry d-7 having an average particle diameter of 3 μm.

Then, similar operations to those of Example IV-5 were repeated except that the slurry d-7 was used instead of the slurry d-1 of Example IV-5, thereby obtaining an exhaust gas purifying catalyst of Example IV-11. The catalyst of Example IV-11 thus obtained is a catalyst in which 0.4 g/L of Pt, 0.112 g/L of Rh and 25 g/L of NiO are supported.

Example IV-12

First, cobalt oxide ($CO_2O_3$) was dispersed in water, followed by milling by a bead mill, so as to prepare $CO_2O_3$ slurry having an average particle diameter of 150 nm. Then, 118.4 g of rectangular boehmite (20 nm×20 nm×60 nm) (containing 24% of moisture) was put into a beaker and dispersed in water, and adjusted to be pH 4 by nitric acid. The $CO_2O_3$ slurry (containing 90 g of $CO_2O_3$) was added to the boehmite slurry, followed by dispersing by stirring at high speed. Then, the slurry thus obtained was dried and baked, so as to prepare powder d-8 in which $CO_2O_3$ was isolated by alumina. Then, 168 g of the powder d-8 and 7 g of boehmite alumina were put into a ball mill. 307.5 g of water and 17.5 g of a 10% nitric acid solution were further put into the ball mill, followed by milling the powder d-8, thereby preparing slurry d-8 having an average particle diameter of 3 μm.

Then, similar operations to those of Example IV-5 were repeated except that the slurry d-8 was used instead of the slurry d-1 of Example IV-5, thereby obtaining an exhaust gas purifying catalyst of Example IV-12. The catalyst of Example IV-12 thus obtained is a catalyst in which 0.4 g/L of Pt, 0.112 g/L of Rh and 25 g/L of $Co_2O_3$ are supported.

Example IV-13

First, iron oxide ($\alpha Fe_2O_3$) was dispersed in water, followed by milling by a bead mill, so as to prepare $\alpha Fe_2O_3$ slurry having an average particle diameter of 500 nm. Then, 118.4 g of rectangular boehmite (20 nm×20 nm×60 nm) (containing 24% of moisture) was put into a beaker and dispersed in water, and adjusted to be pH 4 by nitric acid. The $\alpha Fe_2O_3$ slurry (containing 90 g of $\alpha Fe_2O_3$) was added to the boehmite slurry, followed by dispersing by stirring at high speed. Then, the slurry thus obtained was dried and baked, so as to prepare powder d-9 in which $\alpha Fe_2O_3$ was isolated by alumina. Then, 168 g of the powder d-9 and 7 g of boehmite alumina were put into a ball mill. 307.5 g of water and 17.5 g of a 10% nitric acid solution were further put into the ball mill, followed by milling the powder d-9, thereby preparing slurry d-9 having an average particle diameter of 3 μm.

Then, similar operations to those of Example IV-5 were repeated except that the slurry d-9 was used instead of the slurry d-1 of Example IV-5, thereby obtaining an exhaust gas purifying catalyst of Example IV-13. The catalyst of Example IV-13 thus obtained is a catalyst in which 0.4 g/L of Pt, 0.112 g/L of Rh and 25 g/L of $\alpha Fe_2O_3$ having a particle diameter of 500 nm are supported.

Example IV-14

First, iron oxide ($\alpha Fe_2O_3$) was dispersed in water, followed by milling by a bead mill, so as to prepare $\alpha Fe_2O_3$ slurry having an average particle diameter of 150 nm. Then, γ-alumina powder was dispersed in water, followed by milling by a bead mill, so as to prepare alumina slurry having an average particle diameter of 500 nm. The $\alpha Fe_2O_3$ slurry (containing 90 g of $\alpha Fe_2O_3$) was added to the alumina slurry (containing 90 g of alumina), followed by dispersing by stirring at high speed. Then, the slurry thus obtained was dried and baked, so as to prepare powder d-10 in which $\alpha Fe_2O_3$ was isolated by alumina. Then, 168 g of the powder d-10 and 7 g of boehmite alumina were put into a ball mill. 307.5 g of water and 17.5 g of a 10% nitric acid solution were further put into the ball mill, followed by milling the powder d-10, thereby preparing slurry d-10 having an average particle diameter of 3 μm.

Then, similar operations to those of Example IV-5 were repeated except that the slurry d-10 was used instead of the slurry d-1 of Example IV-5, thereby obtaining an exhaust gas purifying catalyst of Example IV-14. The catalyst of Example IV-14 thus obtained is a catalyst in which 0.4 g/L of Pt, 0.112 g/L of Rh and 25 g/L of $\alpha Fe_2O_3$ are supported.

Example IV-15

First, 180 g of beta zeolite and 100 g of silica sol (containing 20 wt % of silica) were put into a ball mill, and 220 g of water was added thereto, followed by milling, so as to prepare slurry c-2 having an average particle diameter of 3 μm.

Then, similar operations to those of Example IV-5 were repeated except that the slurry c-2 was used instead of the slurry c-1 in Example IV-5, thereby obtaining an exhaust gas purifying catalyst of Example IV-15. The catalyst of Example IV-15 thus obtained is a catalyst in which 0.4 g/L of Pt, 0.112 g/L of Rh and 25 g/L of $\alpha Fe_2O_3$ are supported.

Example IV-16

Similar operations to those of Example IV-5 were repeated except that the slurry c-1 in Example IV-5 was not employed, thereby obtaining an exhaust gas purifying catalyst of Example IV-16. The catalyst of Example IV-16 thus obtained is a catalyst in which 0.4 g/L of Pt, 0.112 g/L of Rh and 25 g/L of $\alpha Fe_2O_3$ are supported.

Example IV-17

First, cerium-zirconium composite oxide particles $CeO_2$:$ZrO_2$=78:22 (ratio by weight)) having an average particle diameter of 30 nm were used as anchor particles, and impregnated with a palladium nitrate solution, so as to prepare cerium-zirconium composite oxide particles A2 supporting 1.0% of palladium (Pd). Then, 118.5 g of rectangular boehmite (20 nm×20 nm×60 nm) (containing 24% of moisture) was put into a beaker and dispersed in water, and adjusted to be pH 4 by nitric acid. 90 g of the cerium-zirconium composite oxide particles A2 was further put into the beaker, followed by dispersing by stirring at high speed. The slurry thus obtained was dried and baked, so as to prepare noble metal powder a-2 in which the cerium-zirconium composite oxide particles A2 were isolated by alumina. Then, 168 g of the noble metal powder a-2, 7 g of boehmite alumina, and 38.41 g of carbon black powder were put into a ball mill. 307.5 g of water and 17.5 g of a 10% nitric acid solution were further put into the ball mill, followed by milling the powder a-2, thereby preparing slurry a-2 having an average particle diameter of 3 µm.

Then, similar operations to those of Example IV-5 were repeated except that the slurry a-2 was used instead of the slurry a-1 in Example IV-5, thereby obtaining an exhaust gas purifying catalyst of Example IV-17. The catalyst of Example IV-17 thus obtained is a catalyst in which 0.4 g/L of Pd, 0.112 g/L of Rh and 25 g/L of $\alpha Fe_2O_3$ are supported.

Example IV-18

Similar operations to those of Example IV-10 were repeated except that the slurry a-2 was used instead of the slurry a-1 in Example IV-10, thereby obtaining an exhaust gas purifying catalyst of Example IV-18. The catalyst of Example IV-18 thus obtained is a catalyst in which 0.4 g/L of Pd, 0.112 g/L of Rh and 25 g/L of $MnO_2$ are supported.

Example IV-19

Similar operations to those of Example IV-11 were repeated except that the slurry a-2 was used instead of the slurry a-1 in Example IV-11, thereby obtaining an exhaust gas purifying catalyst of Example IV-19. The catalyst of Example IV-19 thus obtained is a catalyst in which 0.4 g/L of Pd, 0.112 g/L of Rh and 25 g/L of NiO are supported.

Example IV-20

Similar operations to those of Example IV-12 were repeated except that the slurry a-2 was used instead of the slurry a-1 in Example IV-12, thereby obtaining an exhaust gas purifying catalyst of Example IV-20. The catalyst of Example IV-20 thus obtained is a catalyst in which 0.4 g/L of Pd, 0.112 g/L of Rh and 25 g/L of $CO_2O_3$ are supported.

Comparative Example IV-1

Similar operations to those of Example IV-5 were repeated except that the slurry d-1 in Example IV-5 was not employed, thereby obtaining an exhaust gas purifying catalyst of Comparative Example IV-1. Namely, the catalyst of Comparative Example IV-1 differs from Example IV-5 in that the transition metal oxide layer is not formed. The catalyst of Comparative Example IV-1 thus obtained is a catalyst in which 0.4 g/L of Pt and 0.112 g/L of Rh are supported.

Comparative Example IV-2

First, iron oxide ($\alpha Fe_2O_3$) was dispersed in water, followed by milling by a bead mill, so as to prepare $\alpha Fe_2O_3$ slurry having an average particle diameter of 700 nm. Then, γ-alumina powder was dispersed in water, followed by milling by a bead mill, so as to prepare alumina slurry having an average particle diameter of 700 nm. The $\alpha Fe_2O_3$ slurry (containing 90 g of $\alpha Fe_2O_3$) was added to the alumina slurry (containing 90 g of alumina), followed by dispersing by stirring at high speed. Then, the slurry thus obtained was dried and baked, so as to prepare powder e-1 in which $\alpha Fe_2O_3$ was isolated by alumina. Then, 168 g of the powder e-1 and 7 g of boehmite alumina were put into a ball mill. 307.5 g of water and 17.5 g of a 10% nitric acid solution were further put into the ball mill, followed by milling the powder e-1 thereby preparing slurry e-1 having an average particle diameter of 3 µm.

Then, similar operations to those of Example IV-5 were repeated except that the slurry e-1 was used instead of the slurry d-1 in Example IV-5, thereby obtaining an exhaust gas purifying catalyst of Comparative Example IV-2. The catalyst of Comparative Example IV-2 thus obtained is a catalyst in which 0.4 g/L of Pt, 0.112 g/L of Rh and 25 g/L of $\alpha Fe_2O_3$ having a particle diameter of 700 nm are supported.

Comparative Example IV-3

Similar operations to those of Example IV-15 were repeated except that the slurry d-1 in Example IV-15 was not employed, thereby obtaining an exhaust gas purifying catalyst of Comparative Example IV-3. Namely, the catalyst of Comparative Example IV-3 differs from Example IV-15 in that the transition metal oxide layer is not formed. The catalyst of Comparative Example IV-3 thus obtained is a catalyst in which 0.4 g/L of Pt and 0.112 g/L of Rh are supported.

Comparative Example IV-4

Similar operations to those of Example IV-16 were repeated except that the slurry d-1 in Example IV-16 was not employed, thereby obtaining an exhaust gas purifying catalyst of Comparative Example IV-4. Namely, the catalyst of Comparative Example IV-4 differs from Example IV-16 in that the transition metal oxide layer is not formed. The catalyst of Comparative Example IV-4 thus obtained is a catalyst in which 0.4 g/L of Pt and 0.112 g/L of Rh are supported.

Comparative Example IV-5

Similar operations to those of Example IV-17 were repeated except that the slurry d-1 in Example IV-17 was not employed, thereby obtaining an exhaust gas purifying catalyst of Comparative Example IV-5. Namely, the catalyst of Comparative Example IV-5 differs from Example IV-17 in that the transition metal oxide layer is not formed. The catalyst of Comparative Example IV-5 thus obtained is a catalyst in which 0.4 g/L of Pd and 0.112 g/L of Rh are supported.

Table 6 shows the configuration of the exhaust gas purifying catalysts in Examples IV-1 to IV-12 and Comparative Example IV-1. Table 7 shows the configuration of the exhaust gas purifying catalysts in Examples IV-13 to IV-14 and Comparative Example IV-2. Table 8 shows the configuration of the exhaust gas purifying catalysts in Example IV-15 and Comparative Example IV-3. Table 9 shows the configuration of the exhaust gas purifying catalysts in Example IV-16 and Comparative Example IV-4. Table 10 shows the configuration of the exhaust gas purifying catalysts in Examples IV-17 to IV-20 and Comparative Example IV-5.

TABLE 6

| | Fourth Layer (Flow Path Side Layer) | | | | Third Layer | | | Second Layer | | | First Layer (Lowermost Layer) Material |
|---|---|---|---|---|---|---|---|---|---|---|---|
| | Transition Metal Oxide | Particle Diameter of Transition Metal Oxide (nm) | Barrier Particles | Particle Diameter of Barrier Particles (nm) | Anchor Particles | Noble Metal | Barrier Particles | Anchor Particles | Noble Metal | Barrier Particles | |
| Example IV-1 | αFe$_2$O$_3$ | — | — | — | ZrLa Compound | Rh | Alumina | CeZr Compound | Pt | Alumina | Alumina |
| Example IV-2 | MnO$_2$ | — | — | — | ZrLa Compound | Rh | Alumina | CeZr Compound | Pt | Alumina | Alumina |
| Example IV-3 | NiO | — | — | — | ZrLa Compound | Rh | Alumina | CeZr Compound | Pt | Alumina | Alumina |
| Example IV-4 | Co$_2$O$_3$ | — | — | — | ZrLa Compound | Rh | Alumina | CeZr Compound | Pt | Alumina | Alumina |
| Example IV-5 | αFe$_2$O$_3$ | 150 | Alumina | 60 | ZrLa Compound | Rh | Alumina | CeZr Compound | Pt | Alumina | Alumina |
| Example IV-6 | αFe$_2$O$_3$ | 150 | Silica | 150 | ZrLa Compound | Rh | Alumina | CeZr Compound | Pt | Alumina | Alumina |
| Example IV-7 | αFe$_2$O$_3$ | 150 | Alumina-Silica Mixture | 150 | ZrLa Compound | Rh | Alumina | CeZr Compound | Pt | Alumina | Alumina |
| Example IV-8 | αFe$_2$O$_3$ | 150 | Alumina-Silica Compound | 150 | ZrLa Compound | Rh | Alumina | CeZr Compound | Pt | Alumina | Alumina |
| Example IV-9 | γFe$_2$O$_3$ | 150 | Alumina | 60 | ZrLa Compound | Rh | Alumina | CeZr Compound | Pt | Alumina | Alumina |
| Example IV-10 | MnO$_2$ | 150 | Alumina | 60 | ZrLa Compound | Rh | Alumina | CeZr Compound | Pt | Alumina | Alumina |
| Example IV-11 | NiO | 150 | Alumina | 60 | ZrLa Compound | Rh | Alumina | CeZr Compound | Pt | Alumina | Alumina |
| Example IV-12 | Co$_2$O$_3$ | 150 | Alumina | 60 | ZrLa Compound | Rh | Alumina | CeZr Compound | Pt | Alumina | Alumina |
| Comparative Example IV-1 | — | — | — | — | ZrLa Compound | Rh | Alumina | CeZr Compound | Pt | Alumina | Alumina |

TABLE 7

| | Fourth Layer (Flow Path Side Layer) | | | | Third Layer | | | Second Layer | | | First Layer (Lowermost Layer) Material |
|---|---|---|---|---|---|---|---|---|---|---|---|
| | Transition Metal Oxide | Particle Diameter of Transition Metal Oxide (nm) | Barrier Particles | Particle Diameter of Barrier Particles (nm) | Anchor Particles | Noble Metal | Barrier Particles | Anchor Particles | Noble Metal | Barrier Particles | |
| Example IV-13 | αFe$_2$O$_3$ | 500 | Alumina | 60 | ZrLa Compound | Rh | Alumina | CeZr Compound | Pt | Alumina | Alumina |
| Example IV-14 | αFe$_2$O$_3$ | 150 | Alumina | 500 | ZrLa Compound | Rh | Alumina | CeZr Compound | Pt | Alumina | Alumina |
| Comparative Example IV-2 | αFe$_2$O$_3$ | 700 | Alumina | 700 | ZrLa Compound | Rh | Alumina | CeZr Compound | Pt | Alumina | Alumina |

TABLE 8

| | Fourth Layer (Flow Path Side Layer) | | | | Third Layer | | | Second Layer | | | First Layer (Lowermost Layer) Material |
|---|---|---|---|---|---|---|---|---|---|---|---|
| | Transition Metal Oxide | Particle Diameter of Transition Metal Oxide (nm) | Barrier Particles | Particle Diameter of Barrier Particles (nm) | Anchor Particles | Noble Metal | Barrier Particles | Anchor Particles | Noble Metal | Barrier Particles | |
| Example IV-15 | αFe$_2$O$_3$ | 150 | Alumina | 60 | ZrLa Compound | Rh | Alumina | CeZr Compound | Pt | Alumina | β-Zeolite |
| Comparative Example IV-3 | — | — | — | — | ZrLa Compound | Rh | Alumina | CeZr Compound | Pt | Alumina | β-Zeolite |

TABLE 9

| | Fourth Layer (Flow Path Side Layer) | | | | Third Layer | | | Second Layer | | | First Layer (Lowermost Layer) Material |
|---|---|---|---|---|---|---|---|---|---|---|---|
| | Transition Metal Oxide | Particle Diameter of Transition Metal Oxide (nm) | Barrier Particles | Particle Diameter of Barrier Particles (nm) | Anchor Particles | Noble Metal | Barrier Particles | Anchor Particles | Noble Metal | Barrier Particles | |
| Example IV-16 | αFe$_2$O$_3$ | 150 | Alumina | 60 | ZrLa Compound | Rh | Alumina | CeZr Compound | Pt | Alumina | — |
| Comparative Example IV-4 | — | — | — | — | ZrLa Compound | Rh | Alumina | CeZr Compound | Pt | Alumina | — |

TABLE 10

| | Fourth Layer (Flow Path Side Layer) | | | | Third Layer | | | Second Layer | | | First Layer (Lowermost Layer) Material |
|---|---|---|---|---|---|---|---|---|---|---|---|
| | Transition Metal Oxide | Particle Diameter of Transition Metal Oxide (nm) | Barrier Particles | Particle Diameter of Barrier Particles (nm) | Anchor Particles | Noble Metal | Barrier Particles | Anchor Particles | Noble Metal | Barrier Particles | |
| Example IV-17 | αFe$_2$O$_3$ | 150 | Alumina | 60 | ZrLa Compound | Rh | Alumina | CeZr Compound | Pd | Alumina | Alumina |
| Example IV-18 | MnO$_2$ | 150 | Alumina | 60 | ZrLa Compound | Rh | Alumina | CeZr Compound | Pd | Alumina | Alumina |
| Example IV-19 | NiO | 150 | Alumina | 60 | ZrLa Compound | Rh | Alumina | CeZr Compound | Pd | Alumina | Alumina |
| Example IV-20 | Co$_2$O$_3$ | 150 | Alumina | 60 | ZrLa Compound | Rh | Alumina | CeZr Compound | Pd | Alumina | Alumina |
| Comparative Example IV-5 | — | — | — | — | ZrLa Compound | Rh | Alumina | CeZr Compound | Pd | Alumina | Alumina |

[Catalyst Evaluation]

The catalysts prepared in Examples IV-1 to IV-20 and Comparative Examples IV-1 to IV-5 were used. Five catalysts for each bank were mounted on an exhaust system of a V-type engine with a displacement of 3500 cc. Then, the catalysts were subjected to heat history by a duration test under a condition of a catalyst inlet temperature of 650° C. while the engine was operated for 30 hours using Japanese regular gasoline. After the duration test, each catalyst was installed in a simulated exhaust gas flowing device, through which simulated exhaust gas including the component shown in Table 1 in First Embodiment flowed. Then, temperatures at which each conversion efficiency of HC, CO and NOx became 50% (T50) were observed, while increasing catalyst temperature by 30° C. per minute. Tables 11 to 15 show the evaluation results of each catalyst in Examples IV-1 to IV-20 and Comparative Examples IV-1 to IV-5.

TABLE 11

| | Fourth Layer (Flow Path Side Layer) | | | | T50 (° C.) (50% Purifying Temperature) | | |
|---|---|---|---|---|---|---|---|
| | Transition Metal Oxide | Particle Diameter of Transition Metal Oxide (nm) | Barrier Particles | Particle Diameter of Barrier Particles (nm) | HC | CO | NOx |
| Example IV-1 | αFe$_2$O$_3$ | — | — | — | 331 | 327 | 323 |
| Example IV-2 | MnO$_2$ | — | — | — | 341 | 337 | 333 |
| Example IV-3 | NiO | — | — | — | 343 | 339 | 335 |
| Example IV-4 | Co$_2$O$_3$ | — | — | — | 338 | 334 | 330 |
| Example IV-5 | αFe$_2$O$_3$ | 150 | Alumina | 60 | 328 | 324 | 320 |
| Example IV-6 | αFe$_2$O$_3$ | 150 | Silica | 150 | 326 | 322 | 318 |
| Example IV-7 | αFe$_2$O$_3$ | 150 | Alumina-Silica Mixture | 150 | 327 | 323 | 319 |
| Example IV-8 | αFe$_2$O$_3$ | 150 | Alumina-Silica Compound | 150 | 329 | 325 | 321 |
| Example IV-9 | γFe$_2$O$_3$ | 150 | Alumina | 60 | 327 | 323 | 319 |
| Example IV-10 | MnO$_2$ | 150 | Alumina | 60 | 338 | 334 | 330 |
| Example IV-11 | NiO | 150 | Alumina | 60 | 340 | 336 | 332 |
| Example IV-12 | Co$_2$O$_3$ | 150 | Alumina | 60 | 335 | 331 | 327 |
| Comparative Example IV-1 | — | — | — | — | 346 | 344 | 339 |

TABLE 12

| | Fourth Layer (Flow Path Side Layer) | | | | T50 (° C.) (50% Purifying Temperature) | | |
|---|---|---|---|---|---|---|---|
| | Transition Metal Oxide | Particle Diameter of Transition Metal Oxide (nm) | Barrier Particles | Particle Diameter of Barrier Particles (nm) | HC | CO | NOx |
| Example IV-13 | αFe$_2$O$_3$ | 500 | Alumina | 60 | 331 | 327 | 323 |
| Example IV-14 | αFe$_2$O$_3$ | 150 | Alumina | 500 | 330 | 326 | 322 |
| Comparative Example IV-2 | αFe$_2$O$_3$ | 700 | Alumina | 700 | 347 | 345 | 340 |

TABLE 13

| | Fourth Layer (Flow Path Side Layer) | | | | | T50 (° C.) (50% Purifying Temperature) | | |
|---|---|---|---|---|---|---|---|---|
| | Transition Metal Oxide | Particle Diameter of Transition Metal Oxide (nm) | Barrier Particles | Particle Diameter of Barrier Particles (nm) | First Layer (Lowermost Layer) Material | HC | CO | NOx |
| Example IV-15 | αFe$_2$O$_3$ | 150 | Alumina | 60 | β-Zeolite | 327 | 323 | 319 |
| Comparative Example IV-3 | — | — | — | — | β-Zeolite | 346 | 344 | 339 |

TABLE 14

| | Fourth Layer (Flow Path Side Layer) | | | | | T50 (° C.) (50% Purifying Temperature) | | |
|---|---|---|---|---|---|---|---|---|
| | Transition Metal Oxide | Particle Diameter of Transition Metal Oxide (nm) | Barrier Particles | Particle Diameter of Barrier Particles (nm) | First Layer (Lowermost Layer) Material | HC | CO | NOx |
| Example IV-16 | αFe$_2$O$_3$ | 150 | Alumina | 60 | — | 331 | 337 | 323 |
| Comparative Example IV-4 | — | — | — | — | — | 348 | 346 | 341 |

TABLE 15

| | Fourth Layer (Flow Path Side Layer) | | | | Second Layer | | | T50 (° C.) (50% Purifying Temperature) | | |
|---|---|---|---|---|---|---|---|---|---|---|
| | Transition Metal Oxide | Particle Diameter of Transition Metal Oxide (nm) | Barrier Particles | Particle Diameter of Barrier Particles (nm) | Anchor Particles | Noble Metal | Barrier Particles | HC | CO | NOx |
| Example IV-17 | αFe₂O₃ | 150 | Alumina | 60 | CeZr Compound | Pd | Alumina | 331 | 327 | 323 |
| Example IV-18 | MnO₂ | 150 | Alumina | 60 | CeZr Compound | Pd | Alumina | 339 | 335 | 331 |
| Example IV-19 | NiO | 150 | Alumina | 60 | CeZr Compound | Pd | Alumina | 341 | 337 | 333 |
| Example IV-20 | Co₂O₃ | 150 | Alumina | 60 | CeZr Compound | Pd | Alumina | 336 | 332 | 328 |
| Comparative Example IV-5 | — | — | — | — | CeZr Compound | Pd | Alumina | 349 | 347 | 342 |

In the catalysts in Examples IV-1 to IV-4, $\alpha Fe_2O_3$, $MnO_2$, NiO and $Co_2O_3$ were used as the transition metal oxide. In the catalysts in Examples IV-5 to IV-8, iron oxide ($\alpha Fe_2O_3$) was used as the transition metal oxide. In addition, alumina, silica, the mixture of alumina and silica, and mullite that is the alumina-silica composite oxide were used as the barrier particles, so that the iron oxide layer in which the iron oxide particles were mutually isolated was provided as the uppermost layer. In the catalyst in Comparative Example IV-1, the transition metal oxide layer employed in Examples IV-1 to IV-12 was not formed. In these catalysts, the lowermost layer was coated with alumina as an undercoating.

When comparing the catalysts between these examples, the catalysts of Examples IV-1 to IV-4 had better T50 than the catalyst of Comparative Example IV-1 according to Table 11, which was due to the effect of the transition metal oxide contained in the uppermost layer. However, when the iron oxide layers in these examples were observed by TEM, an aggregation of the transition metal oxide was confirmed. The catalysts in Examples IV-5 to IV-8 employed iron oxide ($\alpha Fe_2O_3$) as the transition metal oxide, and all the catalysts had better T50 than the catalyst of Comparative Example IV-1.

With regard to Example IV-1 and Examples IV-5 to IV-8, the catalysts in Examples IV-5 to IV-8 had better T50 than Example IV-1 according to Table 11. When the iron oxide layers in Examples IV-5 to IV-8 were observed by TEM, inhibition of an aggregation of iron oxide was confirmed. Therefore, it is considered that the aggregation of the iron oxide particles, namely the transition metal oxide particles, can be prevented due to the isolation of those particles by alumina, silica, the mixture of alumina and silica, and mullite ($3Al_2O_3 \cdot 2SiO_2$) as the barrier particles.

In the catalysts in Examples IV-9 to IV-12, $\gamma Fe_2O_3$, $MnO_2$, NiO and $Co_2O_3$ were used as the transition metal oxide, and alumina was used as the barrier particles, so that the transition metal oxide particles were mutually isolated. In these catalysts, the lowermost layer was coated with alumina as an undercoating. With regard to Examples IV-9 to IV-12 and Comparative Example IV-1, the catalysts in Examples IV-9 to IV-12 had better T50 than the catalyst in Comparative Example IV-1 according to Table 11, which was due to the effect of $\gamma Fe_2O_3$, $MnO_2$, NiO and $Co_2O_3$. Therefore, it is considered that the oxide layers of $\gamma Fe_2O_3$, $MnO_2$, NiO and $Co_2O_3$ are effective in improvement in activity. When the oxide layers of those were observed by TEM, inhibition of an aggregation of the respective oxide particles of $\gamma Fe_2O_3$, $MnO_2$, NiO and $Co_2O_3$ was confirmed.

In the catalyst in Example IV-13, iron oxide ($\alpha Fe_2O_3$) was used as the transition metal oxide, and alumina was used as the barrier particles, in which the particle diameter of iron oxide was 500 nm. In the catalyst in Example IV-14, iron oxide ($\alpha Fe_2O_3$) was used as the transition metal oxide, and alumina was used as the barrier particles, in which the particle diameter of alumina was 500 nm. In the catalyst in Comparative Example IV-2, iron oxide ($\alpha Fe_2O_3$) was used as the transition metal oxide, and alumina was used as the barrier particles, in which the particle diameter of iron oxide was 700 nm, and the particle diameter of alumina as the barrier particles was 700 nm. In these catalysts, the lowermost layer was coated with alumina as an undercoating.

With regard to Examples IV-13 and IV-14 and Comparative Example IV-2, improved performance can be confirmed in the catalysts in Examples IV-13 and IV-14 compared to the catalyst in Comparative Example IV-2. When the oxide layers in these examples were observed by TEM, inhibition of an aggregation of the iron oxide particles was confirmed in Examples IV-13 and IV-14. On the other hand, an aggregation of the iron oxide particles was observed in Comparative Example IV-2. Therefore, it is considered that a maximum size of the transition metal oxide particles and the barrier particles is approximately 500 nm. When the transition metal oxide particles and the barrier particles have a particle size of 700 nm, smaller particles may pass through gaps between larger particles because this particle size represents an average particle diameter, which means there may be the particles having a smaller size. Thus, an aggregation may be easily caused in a catalyst having a larger particle size such as 700 nm. Therefore, the transition metal oxide particles and the barrier particles preferably have a particle size that is not too large.

In the catalyst in Example IV-15, iron oxide ($\alpha Fe_2O_3$) was used as the transition metal oxide, and alumina was used as the barrier particles, in which the lowermost layer was coated with β-zeolite as an undercoating. The catalyst in Comparative Example IV-3 did not include the transition metal oxide layer, while employing β-zeolite as an undercoating. According to Table 13, the catalyst in Example IV-15 ensured improved performance compared to the catalyst in Comparative Example IV-3. Therefore, catalyst performance can be improved even in the catalyst employing β-zeolite as an undercoating.

In the catalyst in Example IV-16, iron oxide ($\alpha Fe_2O_3$) was used as the transition metal oxide, and alumina was used as the barrier particles, in which an undercoating was not applied on the catalyst layer. The catalyst in Comparative Example IV-4 did not include the transition metal oxide layer, and was not provided with an undercoating. According to Table 14, the catalyst in Example IV-16 including the iron oxide layer had better catalyst performance than the catalyst in Comparative Example IV-4. Therefore, the effect of the iron oxide layer (transition metal oxide layer) can be confirmed even in the catalyst without an undercoating.

In the catalysts in Examples IV-17 to IV-20, $\alpha Fe_2O_3$, $MnO_2$, NiO and $CO_2O_3$ were used as the transition metal oxide, and alumina was used as the barrier particles, so that the transition metal oxide particles were mutually isolated. In addition, these catalysts were provided with the layer containing Pd as the second layer. The catalyst in Comparative Example IV-5 did not include the transition metal oxide layer, but was provided with the layer containing Pd as the second layer. In these catalysts, the lowermost layer was coated with alumina as an undercoating. With regard to Examples IV-17 to IV-20 and Comparative Example IV-5, the catalysts in Examples IV-17 to IV-20 had better catalyst performance than the catalyst in Comparative Example IV-5 according to Table 15. Therefore, it is considered that the catalyst provided with the transition metal oxide layer can ensure better catalyst performance even the catalyst contains Pd.

According to the examples and the comparative examples, it is considered that exhaust gas is activated when passing through the transition metal oxide layer provided as an uppermost layer, and therefore a purification action in the rhodium layer (third layer) is enhanced. In addition, since the transition metal oxide itself has a purification action, the transition metal oxide layer is preferably provided as an uppermost layer. On the other hand, in the layer only containing the transition metal oxide, the transition metal oxide is easily aggregated because of heat history such as mechanical load. As a result, porosity of the transition metal oxide layer is decreased, which may cause prevention of exhaust gas flow and dispersion. Accordingly, the transition metal oxide particles are preferably isolated mutually by the barrier particles.

The entire contents of Japanese Patent Application No. P2008-175664 (filed on Jul. 4, 2008), Japanese Patent Application No. P2008-287967 (filed on Nov. 10, 2008), Japanese Patent Application No. P2009-055013 (filed on Mar. 9, 2009), and Japanese Patent Application No. P2009-055005 (filed on Mar. 9, 2009) are herein incorporated by reference.

Although the invention has been described, the invention is not limited to the foregoing embodiments, and modifications may become apparent to those skilled in the art within the scope of the invention. Specifically, the undercoat layer described in Fourth Embodiment may be provided in the catalysts in First to Third Embodiments. In addition, the transition metal oxide particles, the anchor particles and the barrier particles prepared by the PVS method described in Fourth Embodiment may be employed in First to Third Embodiments. Moreover, the carbon black powder described in Fourth Embodiment may be used in the catalyst preparations in First to Third Embodiments. Further, the mixed layer in Third Embodiment may be combined with the noble metal layer and the transition metal oxide layer described in First, Second and Fourth Embodiments.

In the claims, a first compound corresponds to the promoter particles 20, a second compound corresponds to the barrier particles 30 surrounding the transition metal oxide particles 10 and the promoter particles 20, a third compound corresponds to the anchor particles 50, and a fourth compound corresponds to the barrier particles surrounding the noble metal particles 40 and the anchor particles 50.

INDUSTRIAL APPLICABILITY

According to the present invention, the transition metal oxide particles are isolated by another compound, so as to inhibit the movement of the transition metal oxide particles. Therefore, an aggregation of the transition metal oxide particles due to heat history is prevented. Accordingly, the exhaust gas purifying catalyst in which a decrease in catalyst activity caused by a reduction of a specific surface area of the transition metal oxide is prevented can be provided.

| REFERENCE SIGNS LIST | |
|---|---|
| 1 | Exhaust gas purifying catalyst |
| 2 | Monolithic substrate |
| 3 | Transition metal oxide layer |
| 4 | Exhaust gas flow path |
| 5 | Noble metal layer |
| 10 | Transition metal oxide particles |
| 20 | Promoter particles (First compound) |
| 30 | Barrier particles (Second compound, Fourth compound) |
| 40 | Noble metal particles |
| 50 | Anchor particles (Third compound) |

The invention claimed is:

1. An exhaust gas purifying catalyst, comprising:
a monolithic substrate;
a transition metal oxide layer formed in the monolithic substrate, the transition metal oxide layer comprising: transition metal oxide powder that includes: transition metal oxide particles; a first compound on which the transition metal oxide particles are supported; and a second compound that surrounds a single body or an aggregate of the transition metal oxide particles and the first compound,
wherein the first compound is an oxide containing at least one selected from the group consisting of cerium, zirconium, cerium zirconium, praseodymium, and lanthanum, and
wherein the second compound is at least one selected from the group consisting of alumina, silicon dioxide, a mixture of alumina and silicon dioxide, a composite compound of alumina and silicon dioxide, and an oxide containing zirconium.

2. The exhaust gas purifying catalyst according to claim 1, further comprising:
a noble metal layer formed in an inner surface of the substrate, the noble metal layer comprising noble metal powder that includes: noble metal particles; a third compound on which the noble metal particles are supported; and a fourth compound that surrounds a single body or an aggregate of the noble metal particles and the third compound,
wherein the third compound is an oxide containing at least one of cerium and zirconium, and
wherein the fourth compound is at least one selected from the group consisting of alumina, silicon dioxide, a mixture of alumina and silicon dioxide, a composite compound of alumina and silicon dioxide, and an oxide containing zirconium.

3. The exhaust gas purifying catalyst according to claim 2, wherein the noble metal layer is disposed on the transition metal oxide layer.

4. The exhaust gas purifying catalyst according to claim 2, wherein the transition metal oxide layer is provided in a position where the transition metal oxide layer comes into contact with exhaust gas prior to the noble metal layer.

5. The exhaust gas purifying catalyst according to claim 2, wherein the transition metal oxide layer is disposed on the noble metal layer.

6. The exhaust gas purifying catalyst according to claim 2, wherein the transition metal oxide layer is located upstream of an exhaust gas flow path in the monolithic substrate, and the noble metal layer is located downstream of the transition metal oxide layer.

7. The exhaust gas purifying catalyst according to claim 2, wherein the transition metal oxide layer is integrated with the noble metal layer so as to form a single mixed layer.

8. The exhaust gas purifying catalyst according to claim 7, wherein another layer of the noble metal layer is disposed on the mixed layer.

9. The exhaust gas purifying catalyst according to claim 1, wherein the transition metal oxide particles are an oxide of at least one metal selected from the group consisting of iron, manganese, nickel, and cobalt.

10. The exhaust gas purifying catalyst according to claim 1, wherein an average particle diameter of the transition metal oxide particles is 500 nm or less.

11. The exhaust gas purifying catalyst according to claim 1, wherein the first compound is at least one of compounds selected from the group consisting of cerium oxide, a cerium-zirconium composite oxide, and praseodymium oxide.

12. The exhaust gas purifying catalyst according to claim 1, wherein an average particle diameter of the first compound is 500 nm or less.

13. The exhaust gas purifying catalyst according to claim 2, wherein each average particle diameter of the second compound and the fourth compound is 500 nm or less.

14. The exhaust gas purifying catalyst according to claim 2, wherein the noble metal particles are rhodium particles.

\* \* \* \* \*